US012586128B2

(12) United States Patent
Deible

(10) Patent No.: US 12,586,128 B2
(45) Date of Patent: Mar. 24, 2026

(54) SYSTEM AND METHOD FOR SMART ORDER ROUTING AND AUTOMATIC MARKET MAKER PATH DETERMINATION IN A DECENTRALIZED MARKET

(71) Applicant: SEMIOTIC AI, INC., Los Altos, CA (US)

(72) Inventor: Matthew Deible, Philadelphia, PA (US)

(73) Assignee: Semiotic A1, Inc., Los Altos, CA (US)

( * ) Notice: Subject to any disclaimer, the term of this patent is extended or adjusted under 35 U.S.C. 154(b) by 657 days.

(21) Appl. No.: 17/665,579

(22) Filed: Feb. 6, 2022

(65) Prior Publication Data

US 2023/0252432 A1    Aug. 10, 2023

(51) Int. Cl.
| | |
|---|---|
| *G06Q 40/00* | (2023.01) |
| *G06F 16/901* | (2019.01) |
| *G06Q 20/38* | (2012.01) |
| *G06Q 40/04* | (2012.01) |
| *G06Q 20/36* | (2012.01) |

(52) U.S. Cl.
CPC ......... *G06Q 40/04* (2013.01); *G06F 16/9024* (2019.01); *G06Q 20/381* (2013.01); *G06Q 20/36* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2020/0342539 A1* | 10/2020 | Doney | ................... | G06Q 40/06 |
| 2021/0035090 A1* | 2/2021 | Iannaccone | ........... | H04L 9/3247 |

FOREIGN PATENT DOCUMENTS

WO    WO-2019147736 A1  *  8/2019   ......... H04L 63/0478

OTHER PUBLICATIONS

Bruno, S. et al., "Symbolic Algorithm for Token Swapping," 2020 IEEE 50th International Symposium on Multiple-Valued Logic (ISMVL).*
Bruno, S. et al., "Symbolic Algorithm for Token Swapping," 2020 IEEE 50th International Symposium on Multiple-Valued Logic (ISMVL) (Year: 2020).*

* cited by examiner

*Primary Examiner* — Olabode Akintola
(74) *Attorney, Agent, or Firm* — Alpine Patents LLC; Brian Van Osdol

(57)    ABSTRACT

A pathfinding method for choosing a swap path between a start token and a target token on one or more distributed ledger technology (DLT) sources that includes: connecting to a DLT source thereby retrieving DLT source data; constructing a reference graph comprising nodes and edges from the DLT source data; traversing the reference graph, therein iteratively calculating swap efficiencies for all swap paths between a start token and a target token by applying gradient descent to all swap path traversals, and determining a select swap path based on all swap efficiencies. The method may further include pruning the reference graph or traversal, wherein nodes, edges, and/or swaps that are determined to be negligible, are removed from the traversal parameters.

18 Claims, 24 Drawing Sheets

Connecting to a DLT source S110

Constructing a reference graph S120

Determining traversal hyperparameters S130

Determining a maximum number of steps S132

Traversing the reference graph S140

Executing all swap paths S142

Determining a swap efficiency for all swap paths S144

Determining a select swap path S150

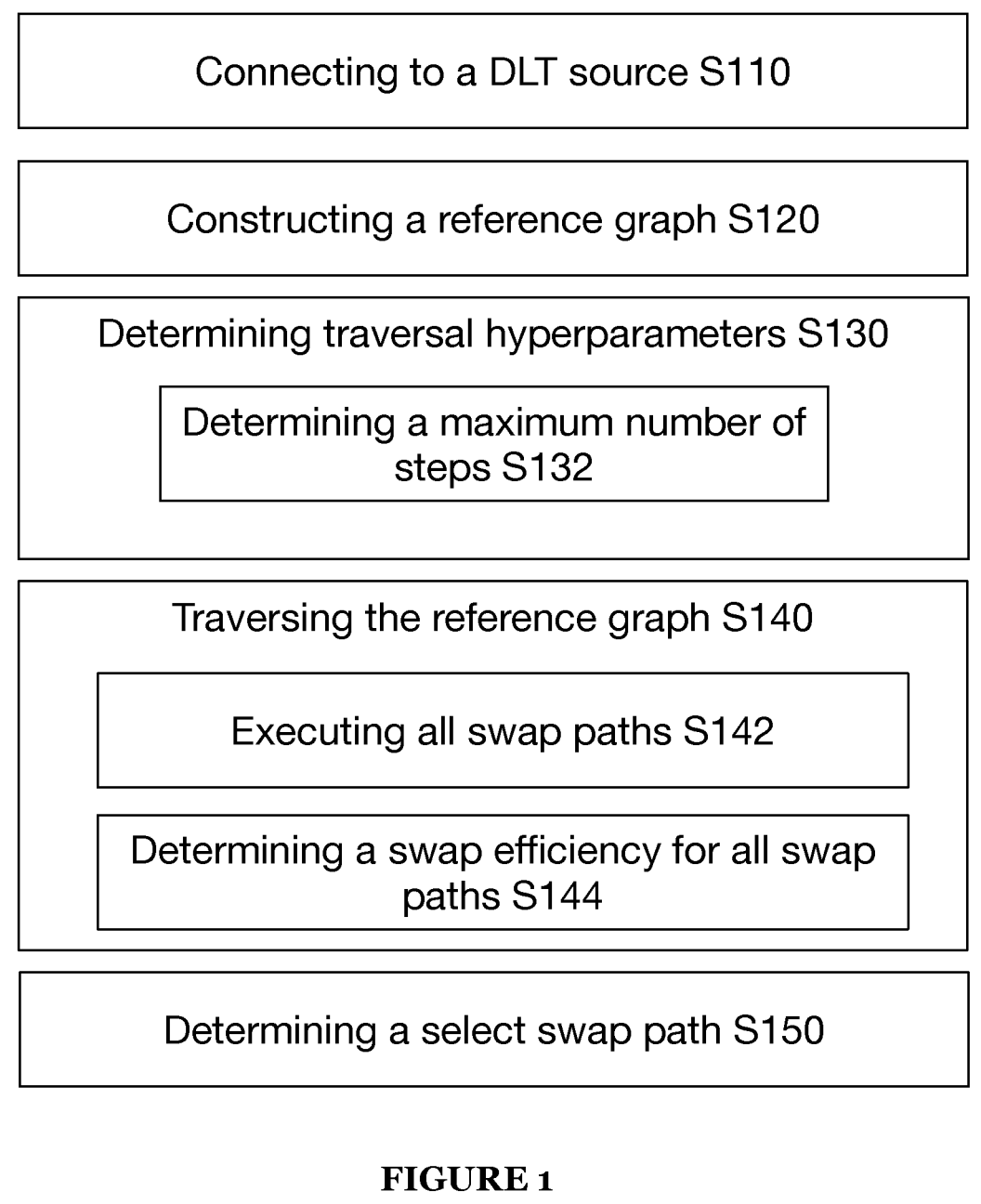

Connecting to a DLT source S110

Constructing a reference graph S120

Determining traversal hyperparameters S130

Determining a maximum number of steps S132

Traversing the reference graph S140

Executing all swap paths S142

Determining a swap efficiency for all swap paths S144

Determining a select swap path S150

FIGURE 1

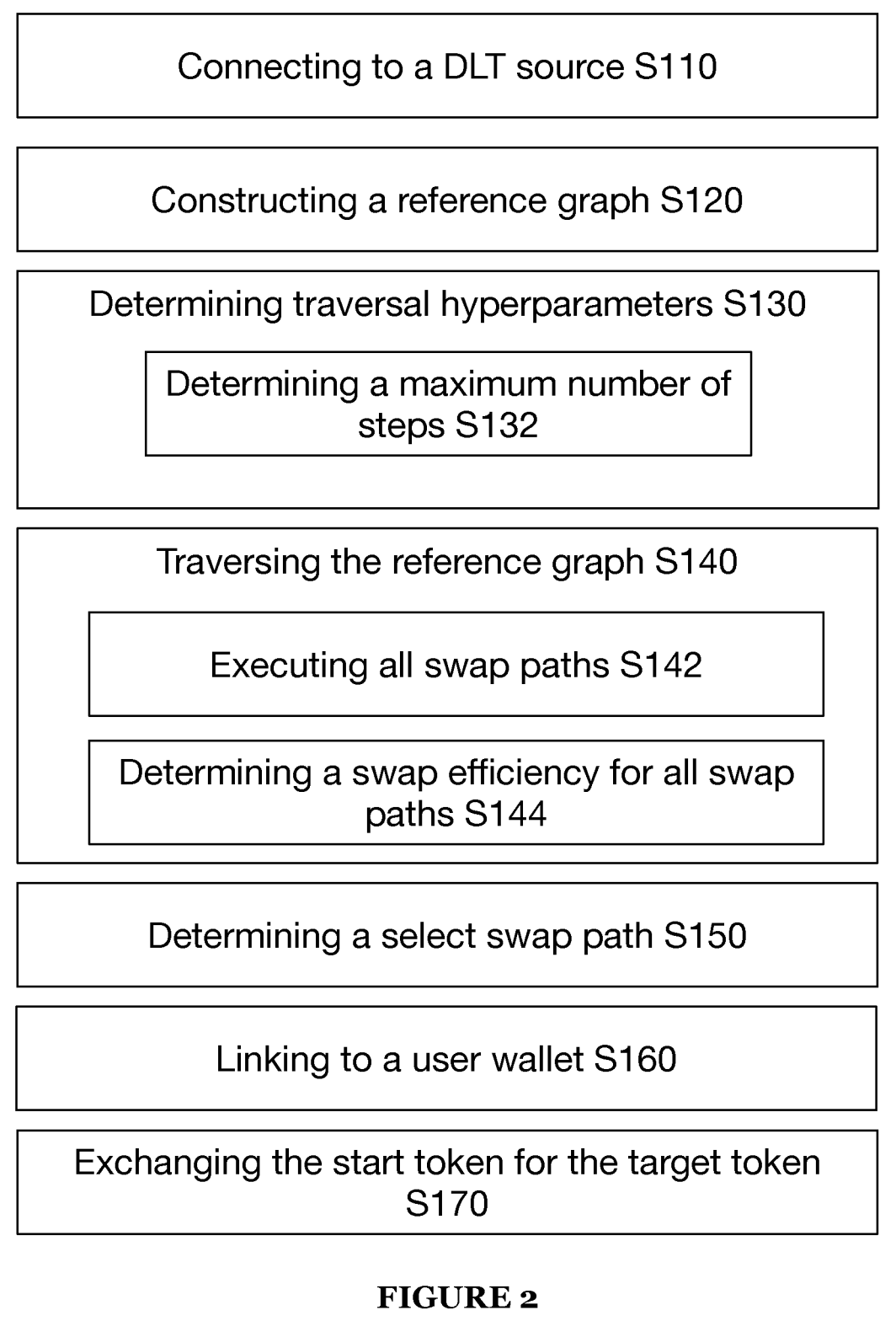

Connecting to a DLT source S110

Constructing a reference graph S120

Determining traversal hyperparameters S130

Determining a maximum number of steps S132

Traversing the reference graph S140

Executing all swap paths S142

Determining a swap efficiency for all swap paths S144

Determining a select swap path S150

Linking to a user wallet S160

Exchanging the start token for the target token S170

FIGURE 2

Logit tensors for FIGURE 7

|  |  | Origin A | | Origin B | | Origin C | |
|---|---|---|---|---|---|---|---|
|  |  | Dex M | Dex N | Dex M | Dex N | Dex M | Dex N |
| Step 1 | Des. A | $L$1, A->A,(M) | $L$1, A->A,(N) | $L$1, B->A,(M) | $L$1, B->A,(N) | $L$1, C->A,(M) | $L$1, C->A,(N) |
|  | Des. B | $L$1, A->B,(M) | $L$1, A->B,(N) | $L$1, B->B,(M) | $L$1, B->B,(N) | $L$1, C->B,(M) | $L$1, C->B,(N) |
|  | Des. C | $L$1, A->C,(M) | $L$1, A->C,(N) | $L$1, B->C,(M) | $L$1, B->C,(N) | $L$1, C->C,(M) | $L$1, C->C,(N) |
| Step 2 | Des. A | $L$2, A->A,(M) | $L$2, A->A,(N) | $L$2, B->A,(M) | $L$2, B->A,(N) | $L$2, C->A,(M) | $L$2, C->A,(N) |
|  | Des. B | $L$2, A->B,(M) | $L$2, A->B,(N) | $L$2, B->B,(M) | $L$2, B->B,(N) | $L$2, C->B,(M) | $L$2, C->B,(N) |
|  | Des. C | $L$2, A->C,(M) | $L$2, A->C,(N) | $L$2, B->C,(M) | $L$2, B->C,(N) | $L$2, C->C,(M) | $L$2, C->C,(N) |
| Step 3 | Des. A | $L$3, A->A,(M) | $L$3, A->A,(N) | $L$3, B->A,(M) | $L$3, B->A,(N) | $L$3, C->A,(M) | $L$3, C->A,(N) |
|  | Des. B | $L$3, A->B,(M) | $L$3, A->B,(N) | $L$3, B->B,(M) | $L$3, B->B,(N) | $L$3, C->B,(M) | $L$3, C->B,(N) |
|  | Des. C | $L$3, A->C,(M) | $L$3, B->A,(N) | $L$3, B->C,(M) | $L$3, B->C,(N) | $L$3, C->C,(M) | $L$3, C->C,(N) |

FIGURE 9

Setting initial conditions and propagating path steps

Start Values (Start token A)
$A_0 = x$; $B_0 = 0$; $C_0 = 0$

| | | Origin A | | Origin B | | Origin C | |
|---|---|---|---|---|---|---|---|
| | | Dex M | Dex N | Dex M | Dex N | Dex M | Dex N |
| Step 1 | Des. A | -INF | -INF | $L^1$, B->A,(M) | $L^1$, B->A,(N) | $L^1$, C->A,(M) | $L^1$, C->A,(N) |
| | Des. B | $L^1$, A->B,(M) | $L^1$, A->B,(N) | -INF | -INF | $L^1$, C->B,(M) | $L^1$, C->B,(N) |
| | Des. C | $L^1$, A->C,(M) | $L^1$, A->C,(N) | $L^1$, B->C,(M) | $L^1$, B->C,(N) | -INF | -INF |
| Step 2 | Des. A | -INF | -INF | $L^2$, B->A,(M) | $L^2$, B->A,(N) | $L^2$, C->A,(M) | $L^2$, C->A,(N) |
| | Des. B | $L^2$, A->B,(M) | $L^2$, A->B,(N) | -INF | -INF | $L^2$, C->B,(M) | $L^2$, C->B,(N) |
| | Des. C | $L^2$, A->C,(M) | $L^2$, A->C,(N) | $L^2$, B->C,(M) | $L^2$, B->C,(N) | -INF | -INF |
| Step 3 | Des. A | -INF | -INF | $L^3$, B->A,(M) | $L^3$, B->A,(N) | $L^3$, C->A,(M) | $L^3$, C->A,(N) |
| | Des. B | $L^3$, A->B,(M) | $L^3$, A->B,(N) | -INF | -INF | $L^3$, C->B,(M) | $L^3$, C->B,(N) |
| | Des. C | $L^3$, A->C,(M) | $L^3$, B->A,(N) | $L^3$, B->C,(M) | $L^3$, B->C,(N) | -INF | -INF |

FIGURE 14

SYSTEM AND METHOD FOR SMART ORDER ROUTING AND AUTOMATIC MARKET MAKER PATH DETERMINATION IN A DECENTRALIZED MARKET

TECHNICAL FIELD

This invention relates generally to the field of decentralized finance, and more specifically to a new and useful system and method for determining and executing an automatic market maker path for smart order routing in a decentralized market.

BACKGROUND

With bitcoin's fairly recent blockchain innovation and the advent of Turing complete decentralized computation with Ethereum's smart contracts, the field of decentralized finance has exploded. Decentralized exchanges (DEXs) provide marketplaces that are transparent, more tamper-proof compared to centralized exchanges, and allow open and fair participation by all parties. One weakness of these decentralized markets is their potential volatility (although not necessarily more volatile than centralized exchanges). With the rapid growth of these markets and the creation of so many currencies (i.e., tokens), navigating trades on these markets has developed much further from simple currency/token swaps on a single exchange. Although there are many dApps (decentralized applications) that enable transactions and provide analytics for token exchanges, there has been little progress made to evaluate more complex multi-token and/or multi-DEX transactions, where exchanging through intermediary tokens and splitting among many DEXs are also analyzed.

Thus, there is a need in the field decentralized finance to create a new and useful system and method for complex multi-token analysis and exchange in decentralized markets. This invention provides such a new and useful system and method.

BRIEF DESCRIPTION OF THE FIGURES

FIG. 1 is a flowchart representation of a first method.
FIG. 2 is a flowchart representation of a second method.
FIG. 9 is a tensor description of the edges of FIG. 7 for each path step.
FIGS. 14-16 is an example pruning of the first example reference graph.

DESCRIPTION OF THE EMBODIMENTS

Figure 3:
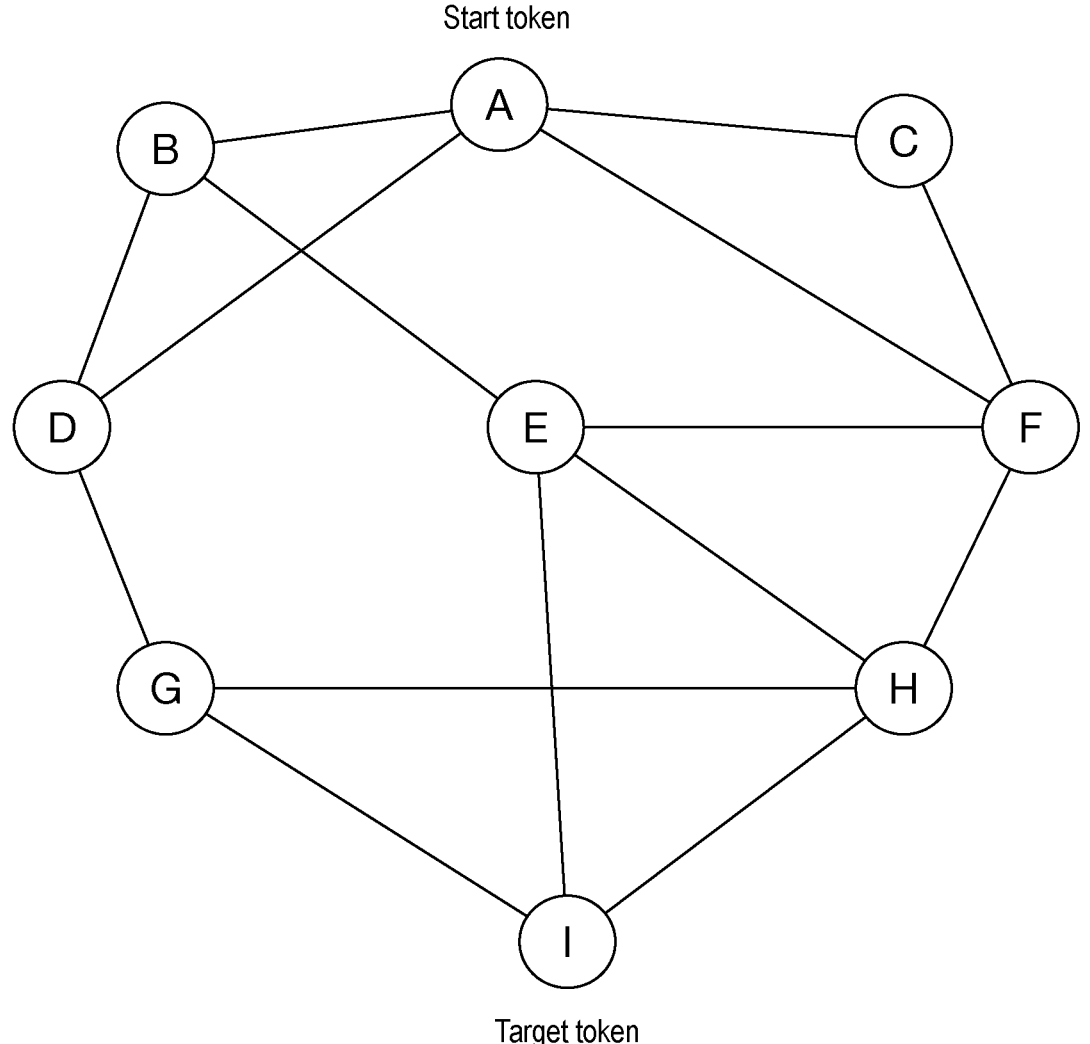
FIG. 3 is an example reference graph.

The following description of the embodiments of the invention is not intended to limit the invention to these embodiments but rather to enable a person skilled in the art to make and use this invention.

1. Overview

A system and method for one or more processors with an interface to one or more distributed ledgers and computer readable medium storing machines for pathfinding a swap path between a start token and a target token on a plurality of liquidity sources (e.g., liquidity pools from one or more decentralized exchanges (DEX)) includes: at the one or more processors, connecting to at least one distributed ledger; at the computer readable medium storing machines, constructing a reference graph from the liquidity sources; at the processors, traversing the reference graph along all possible paths; and at the processors, determining a favorable path for traversing the reference graph. The reference graph comprises nodes, that represent tokens on one or more distributed ledgers; and edges, that represent liquidity sources. An automatic market maker (AMM) function may define each edge, providing the state-dependent "exchange rate" at which tokens can be converted (swapped) between the connected nodes. Exploring the reference graph comprises a graph traversal by traversing, in a step-wise fashion (from one node to all neighboring nodes, per step), from the start token to the target token. Determining a favorable path includes iterations of: applying a gradient descent step to all traversed edges after each full graph traversal, followed by the optional step of removing distinctly non-favorable edges from the reference graph. As the edges represent complex exchange functions set by finite liquidity sources, a single path may not be the optimal traversal of the reference graph. The system and method functions to determine favorable paths between the start token and exchange token by applying an iterative smart order routing (SOR) optimization to the pathing.

The system and method may be applied generally in the field of decentralized finance to evaluate and/or initiate trades using decentralized exchanges (DEXs) or other liquidity sources. The system and method are particularly applicable to be implemented using DEXs or other liquidity sources on public distributed ledgers, where favorable token trades, potentially through intermediary tokens, may be determined and implemented.

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

The system and method provide the potential benefit of an efficient product that determines optimal order routes and applies them in a short enough time frame prior to state updates of most distributed ledger technology, especially blockchains.

Additionally, the system and method provide the benefit of finding complex optimal paths between tokens. That is, system and method may find favorable swap paths that include using multiple decentralized exchanges or other liquidity sources and multiple paths simultaneously.

Although many optimization products have been constructed for optimizing routing through decentralized liquidity sources, current popular products provide inefficient and suboptimal solutions that are unable to fully and precisely search the full complex space of possible paths through decentralized liquidity sources. The system and method provide the potential benefit of a continuous optimization that enables capturing the complexity of large numbers of decentralized liquidity sources and their corresponding automatic market maker (AMM) functions. Although many optimization products have been constructed for optimizing routing through decentralized liquidity sources, current popular products provide inefficient and suboptimal solutions that are unable to fully and precisely search the full complex space of possible paths through decentralized liquidity sources. The system and method provide the potential benefit of a continuous optimization that enables capturing the complexity of large numbers of decentralized liquidity sources and their corresponding automatic market maker (AMM) functions.

The system and method may leverage properties of distributed ledger technologies (DLTs) to find/generate, and initiate optimized exchanges that may not have been previously observed or possible. As one potential benefit with respect to DLTs, the system and method may access, generate reference graphs, and initiate exchanges for liquidity sources over multiple distributed ledgers.

2. Method

As shown in FIG. 1, a method for a token swap on one or more distributed ledger technology (DLT) sources includes: connecting to a DLT source Silo, thereby retrieving DLT source state data; from the DLT source state data, constructing a reference graph S120, comprising nodes and edges; determining traversal hyperparameters for the reference graph S130; at a processor system configured to perform iterative processing, traversing the reference graph S140, therein iteratively calculating swap efficiencies for all swap paths between a start token and a target token; and determining a select swap path based on all swap efficiencies. Constructing a reference graph S120, comprises constructing a graph with nodes and edges: wherein each node represents a token on the DLT source and has a non-negative token value depicting the amount of token held/owned, and wherein the start token is the only token with an initial positive token value; and wherein each edge connects a pair of neighboring nodes (i.e., token pairs) and comprises a direction dependent automatic market maker (AMM) function that defines how a corresponding liquidity source allows conversions/swaps between two or more tokens. Determining traversal hyperparameters for the reference graph S130, includes: determining a maximum number of steps S132, corresponding to a maximum number of path steps for a swap path, i.e., the maximum number of intermediary nodes traveled to traverse the reference graph from the start token to the target token. Traversing the reference graph S140, is an iterative process that comprises: from the start token to the target token, executing all swap paths S142, wherein each swap path includes fewer intermediary nodes than the maximum number of steps; and for all swap paths, determining a swap efficiency. In some variations, traversing the reference graph may optionally include: pruning negligible paths of the reference graph traversal, effectively removing negligible nodes and edges from the reference graph traversal. Dependent on implementation, the select swap path may comprise one, or more, swap paths between the start token and the target token. The method functions to identify desirable token swaps on an exchange (particularly a decentralized exchange on a DLT source), and to execute that token swap.

The method may be implemented with a system that includes: a processor system comprising one, or more, hardware processors with interfaces to all distributed ledger technologies (DLTs) being considered, and a computer readable medium (e.g., a non-transitory medium) storing machine instructions, where when executed cause the hardware processors to perform the operations described herein. Thus, the method may comprise: through a DLT interface, connecting to a DLT source Silo; on the computer readable medium storing machine, constructing a reference graph S120; at the processor system, determining traversal parameters for the reference graph S130; at the processor system configured to perform iterative processing, traversing the reference graph S140, therein iteratively calculating swap efficiencies for swap paths between the start token and the target token; at the processor system, determining a select swap path S150 based on all swap efficiencies. In variations that include pruning negligible paths of the reference graph, the processor system may determine the eligibility for pruning which would then be updated in the traversal parameters on the computer readable medium storing machine.

As one integration process of the method is to access liquidity sources, herein DLTs are broadly defined as any ledger system that includes liquidity source data. Examples of potential DLTs include: distributed ledgers, centralized ledgers, decentralized ledgers, blockchains, Merkle trees, directed acyclic graphs (DAGs), Optimistic, Zero Knowledge, or other rollup technology and other layer 2 scaling solutions, etc. In many variations, liquidity sources may be on exchanges (e.g., decentralized exchanges (DEXs) and centralized exchanges (CEXs)) based on DLTs. The method may be implemented on any and/or all decentralized exchanges or other liquidity sources on one, or multiple, DLT sources. The method may be implemented on any type of DLT source (e.g., public, private, blockchain, rollup, hashgraph, DAG, Holochain, etc.) that enables the incorporation of decentralized markets. Examples of public distributed ledger technologies include: Ethereum, Binance Smart Chain, Bitcoin, EOS, Hedera Hashgraph, Solana, Avalanche, Fantom, Polygon, Arbitrum, Optimism, zkSync, xDai, Harmony, Tron, Celo, Tezos, Near, Moonriver, etc.

As used herein, blockchain is considered a DLT. As used herein, a blockchain comprises a platform where all transactions occur in immutable "blocks" of data, wherein these blocks are determined and checked through a distributed ledger system. On the blockchain platform, the latest state of the system is determined with each addition of a block (i.e., block update). Each block addition is completed through some consensus mechanism. Examples of consensus mechanisms include: Proof of Work, wherein participants compete to solve computationally expensive puzzles in order to decide the next block; and Proof of Stake, wherein participants are chosen randomly to add the next block with a probability proportional to the amount of economic value they have staked; or any other mechanism in which participants can use some scarce resource in order to be selected to add the next block. The time required for each block update may be dependent on the specific blockchain, the complexity of the added block, and potentially other factors. In some cases, block updating takes on the order of minutes or ins of minutes (e.g., bitcoin). The range block updating may vary significantly, and in other cases may only take up to a few seconds. With respect to the blockchain, the method runs to completion at a time scale faster than block updates of blockchains. That is, the method functions to connect to one or more DLT sources, identify favorable token swaps, and execute those token swaps to completion on the order of less than seconds.

The method may be implemented for any system that includes liquidity sources. Many liquidity sources can be found in groups know as decentralized exchanges (DEXs). The method connects to the corresponding DLT source to read the current states of liquidity sources on the DEX, constructs a reference graph, and iteratively traverses the reference graph to determine an "optimal" swap path from a start token to a target token. As used herein, a DEX is a platform that enables a market exchange without intermediaries. A DEX is a protocol that uses smart contracts to facilitate trading between tokens on one or more DLTs, wherein each token that can be swapped on the DEX is defined by its own smart contract, or otherwise defined on the DLT source in question. The method may alternatively be implemented on other types of exchanges (e.g., centralized exchanges).

Generally, the method is implemented with a system that includes a wallet (also referred to as electronic wallet or crypto-wallet), wherein the wallet "contains" the start token. As used herein, a wallet is a storage device that "contains" some amount of a token if that wallet stores the private keys corresponding to a public address with a balance of that amount, or otherwise has some mechanism allowing the user to send or transact the specified amount of token on the relevant DLT. Thus, in some variations, the method may include: setting up a wallet associated with the desired DLT source. Additionally, the wallet may correspond to a public address, enabling the transfer of funds to the wallet. The method may be implemented with both hardware (locally owned) wallets and software (app-based) wallets. Thus, setting up a wallet associated with the desired DLT source(s) comprises obtaining (e.g., by purchase) a desired amount of start token and storing the private key used to transact the start token in the wallet.

In some variations, the method may be implemented as a service. That is, upon a user request, for a given token value of a user owned start token, the service determines an optimal trade path between the start token to a user desired target token and performs the trade for the user. As shown in FIG. 2, in these variations, the method may further include linking to a user wallet S170, wherein the wallet contains the start token; and via the favorable swap path, exchanging the start token for the target token S180, thereby storing the resulting amount of the target token in the user wallet. Exchanging the start token for the target token S180 may further comprise: at the DLT interface, sending an exchange request, and at the DLT interface, reading the resulting included transaction that includes swaps for all intermediary tokens and the target token. In variations, where the user does not provide a wallet, the method may additionally include setting up a user wallet (e.g., an app-based wallet) or taking the start tokens from another source (e.g., a smart contract or smart contract function).

The method may be implemented for multiple, distinct, start tokens. In these variations, the method may be implemented with multiple start tokens; or the method may be implemented multiple times, possibly simultaneously, for each distinct start token. The method may additionally be implemented for distinct sets of the same start token. That is, for start tokens located on different exchanges or DLT sources. For example, in one method implementation, the start token may include a certain quantity of start token (e.g., USD coin) on the Ethereum blockchain, and another certain quantity on the Polygon blockchain. In some implementations a certain amount of each start token may be specified; in other implementations the exact amounts of each start token may instead be optimized along with the traversal parameters. For example, a total amount of starting USD coin may be specified while the algorithm is allowed to optimize the proportion of that total amount that begins on each DLT being considered. More complex start token arrangements are also possible.

The method may be implemented for multiple, distinct, target tokens. In these variations, the method may be implemented with multiple target tokens; or the method may be implemented multiple times, possibly simultaneously, for each distinct target token. The method may additionally be implemented for distinct sets of the same target token. That is, for target tokens located on different DLT sources. For example, in one method implementation, the target token may include the target token (e.g., USD coin) on the Ethereum blockchain and on the Polygon blockchain. In some implementations the algorithm may optimize for exact amounts of some or all of the target tokens; other implementations may optimize for some ratio of some or all of the target tokens; other implementations may optimize for a weighted some of all or some of the target tokens; other implementations may optimize for any combination of these methods. More complex target token optimization specifications are also possible.

Block S110, which includes connecting to a DLT source, functions both to enable transactions on a decentralized marketplace, and to enable gathering information from the DLT source. Connecting to a DLT source Silo may include connecting to one, or multiple, DLT sources. Connecting to a DLT source S110 may include retrieving state data with regards to liquidity sources on the DLT source. The state data may include information regarding: liquidity source states on the DLT source, and information regarding one, some, or all tokens on the DLT source. This information may include smart contracts and liquidity pools associated with the tokens. Additional information may be collected as desired per implementation.

In many variations, connecting to a DLT source S110 may include reading the state of a DEX on the DLT source. Block S110 may include reading the state of a single DEX or multiple DEXs. It may additionally include reading the state of one or more DEXs existing on one or more DLT sources. Reading the state of a DEX may occur directly through, e.g., an API for the DEX, and/or through an intermediary application or platform (e.g., using an intermediary decentralized application (dAPP) on a DLT source that interfaces with components of the desired DEX). A local copy of this subset of the DLT source state may then be kept for further computation. A DLT source state is updated by its corresponding mechanism, where the state of liquidity sources may also change. Thus, to stay relevant, the local state must be updated periodically by connecting to the DLT source S110, in correspondence to that DLT source being updated (e.g., addition of a new block to a blockchain). In some implementations a WebSocket or other DLT monitoring mechanism may be set up to watch for changes in the subset of the DLT state that pertains to the liquidity sources of interest. This monitoring mechanism may directly connect to a node in the corresponding DLT source network, or alternatively may utilize a third-party service to monitor changes in the DLT source state. When such a change is detected, that change can also be applied to the locally kept state, allowing the local state to mirror the current DLT source state in an efficient manner.

In some variations, connecting to a DLT source 110 may comprise reading the state of the decentralized liquidity sources, which may include reading the state of one or more DEXs or other liquidity sources on one or more DLT sources. Examples of possible, current, decentralized liquidity sources include: Uniswap V2 and V3 on Ethereum, Balancer on Ethereum, Polygon, and Arbitrum, Curve on Ethereum, Polygon, Avalanche, Arbitrum and other DLTs, Sushiswap on Ethereum and multiple other DLTs, EtherDelta on Ethereum, Kyber Network on Ethereum, BSC, Polygon, and Avalanche, etc. Connecting to a public DLT to read the state of a DEX or other liquidity source may occur as described above. For example, the Uniswap V2 liquidity pool state data on Ethereum may be read by connecting to an Ethereum node and sending a JSON-RPC request for the latest state of the relevant smart contract storage variables. Alternatively, a third-party data service such as The Graph protocol can be used to query for the most recent state of a DEX or other liquidity source on one or more DLT sources. The best method for reading data for a specific DEX or other liquidity source may vary, dependent on the specific case. V2 liquidity pool state data on Ethereum may be read by connecting to an Ethereum node and sending a JSON-RPC request for the latest state of the relevant smart contract storage variables. Alternatively, a third-party data service such as The Graph protocol can be used to query for the most recent state of a DEX or other liquidity source on one or more DLT sources. The best method for reading data for a specific DEX or other liquidity source may vary, dependent on the specific case.

In some variations, connecting to a DLT source Silo and retrieving liquidity source information may include creating a liquidity source (e.g., a DEX). The created DEX, or other liquidity source, may comprise liquidity pools of existing tokens from corresponding DLT sources, or may include defining new tokens on a DLT source. That is, dependent on implementation, the newly created liquidity source may comprise creating a market for already existing tokens, and/or creating new market tokens, i.e., creating new smart contract-based tokens.

Figure 4:
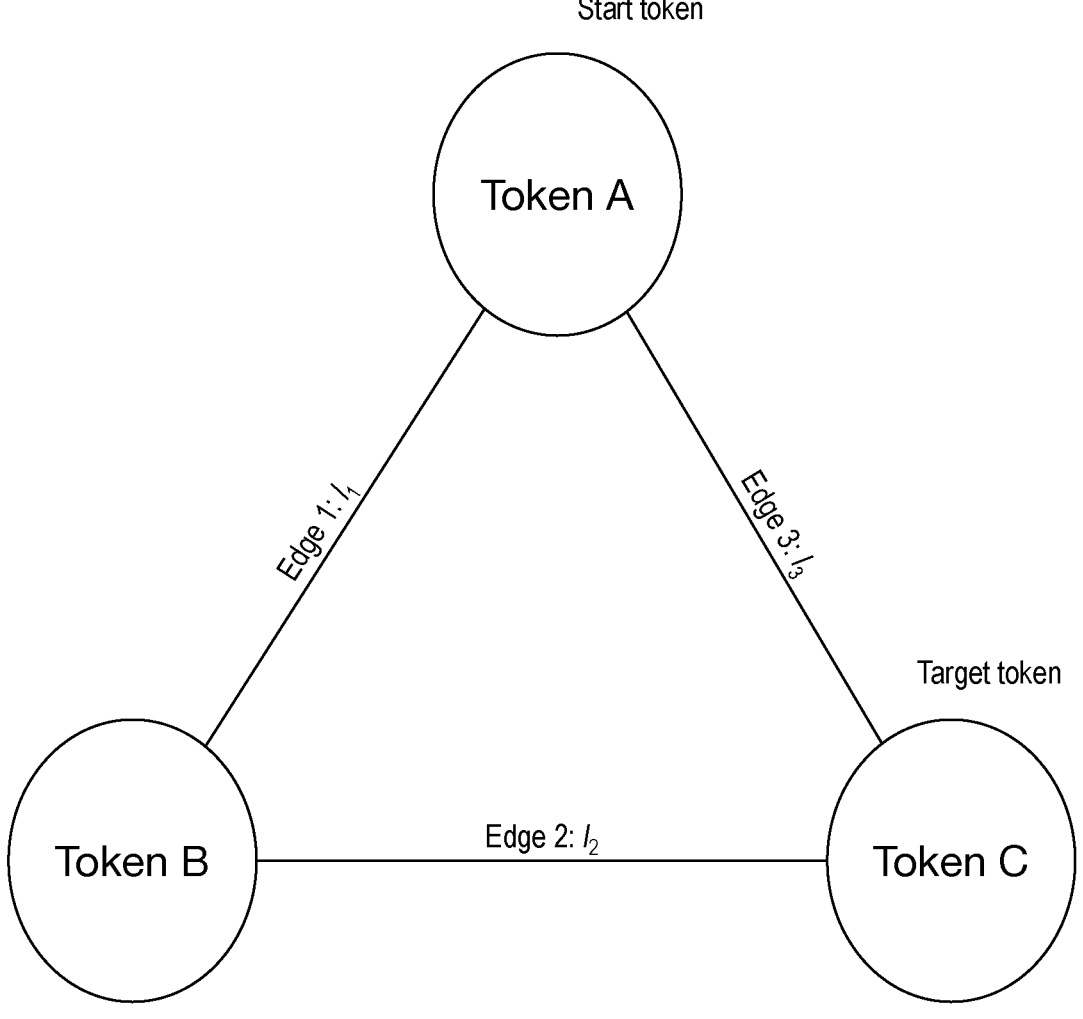
FIG. 4 is a second example reference graph.

Block S120, which includes constructing a reference graph S120, functions to create a reference data structure from which all relevant paths between the start token and the target token can be constructed. In some implementations, the reference graph may be represented as an adjacency list. As shown in the examples FIGS. 3 and 4, the method leverages DLT source data regarding the state of liquidity sources (e.g., from a DEX) to construct a graph of all tokens (nodes) and edges (liquidity sources) being considered from which all possible paths between the start token and the target token can be constructed. In this representation, each node of the reference graph represents a token defined on one or more DLT sources and edges represent liquidity sources on one or more DLT sources that allow transfer of tokens from one node to another as defined by an automatic market maker (AMM) algorithm. In many variations, constructing a reference graph S120 may not include every possible liquidity source on all considered DLT sources, but may preferably include only relevant liquidity sources. In some variations, user desired liquidity sources may be added, removed, or prioritized. Relevant liquidity sources may include those that could be included in at least one possible path between the start token and target token with a limitation of the maximum number of steps (as described below), or limitation on the amount of liquidity (or some other qualifying metric) needed to be considered. Thus, FIG. 3 shows a sample reference graph for a traversal of at least steps between the start and target token, and FIG. 4 shows an example reference graph for a traversal of at least one steps. The reference graph may be dependent on the state of the DLT source (e.g., a blockchain). For example, for a blockchain DLT source, constructing or updating a reference graph S120 may occur whenever a new block is added to the blockchain.

Liquidity sources provide a way to swap between tokens, defined by a smart contract or other code on one or more DLT sources. Tokens are represented as nodes on the reference graph, where each node includes a token value, i.e., the amount of token currently owned by the routing smart contract. As nodes are the reference graph representation of tokens, as used herein the terms nodes and tokens may be used interchangeably. Commonly, tokens represent cryptocurrencies (e.g. the native coin of a DLT, an ERC20 token on Ethereum and Ethereum scaling solutions or a BEP20 token on Binance Smart Chain), but may additionally, or alternatively, represent other types of currencies (e.g., state currencies such as the US dollar).

On the reference graph, each token has a token value, a non-negative integer, representing the quantity of the token that the smart contract or other swap executing mechanism will be able to transact at that time. As part of the method, initially only the start token has a non-zero value. In trading implementations with a wallet, the start token must be a token that is contained, in sufficient quantity, within the wallet of the user or in some other form that routing smart contract can receive from. The method may be implemented for multiple start tokens, wherein all start tokens would have positive starting values. In an analogous fashion, only the target token has a positive value after implementation of the method. As mentioned above, the method may be implemented for multiple target tokens, wherein one or more of the specified target tokens would have positive values after the swap execution. Intermediary tokens (i.e., not the start token(s) or target token(s)) may have positive values during the reference graph traversal, but will be zero initially and zero after the final step. It should be noted, that due to limits in rounding and enforcing partial trades, some tokens may have "relatively" small non-zero values. As used herein, a zero token value refers to a token value less than the fixed-point precision of that token on relevant DLT sources.

Figure 5:
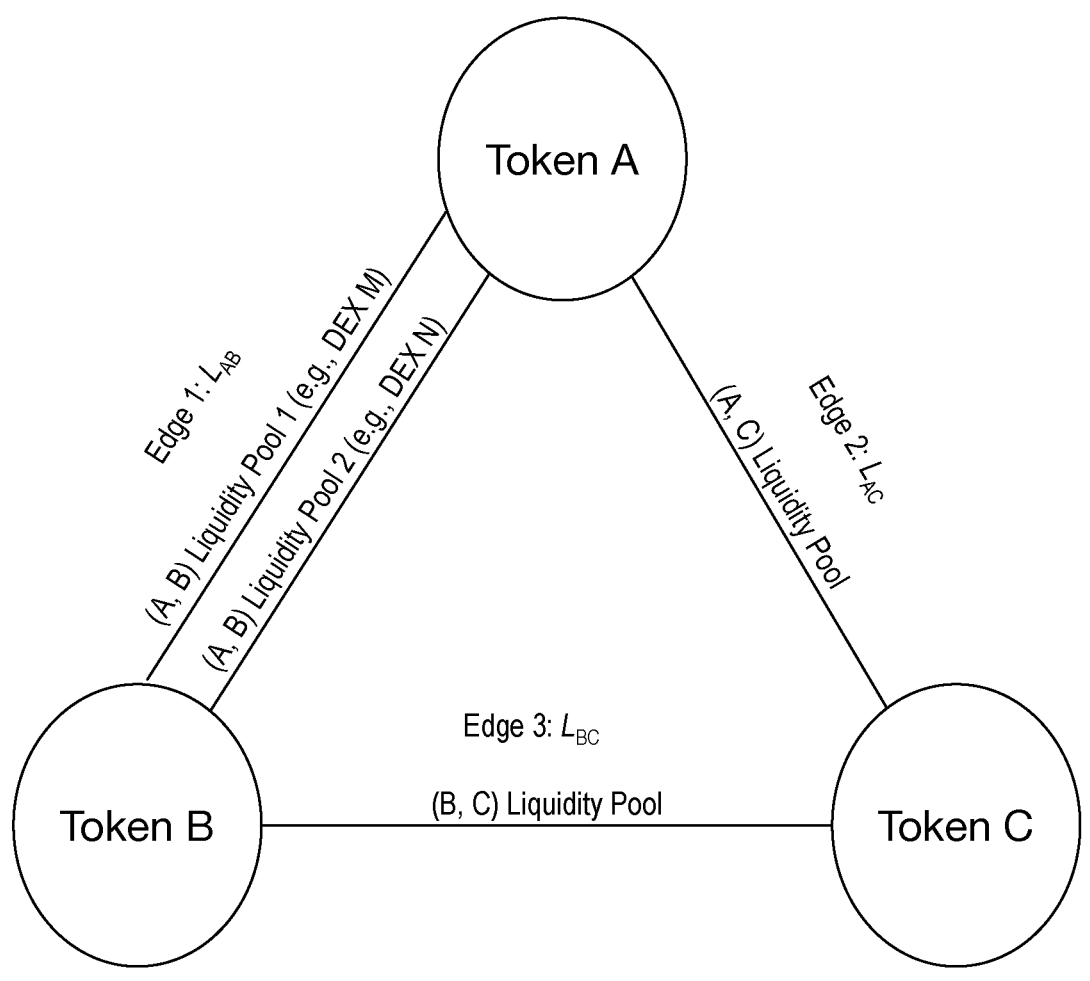
FIG. 5 is an example reference graph representation with multiple liquidity pools incorporated into a single edge.
Figure 6:
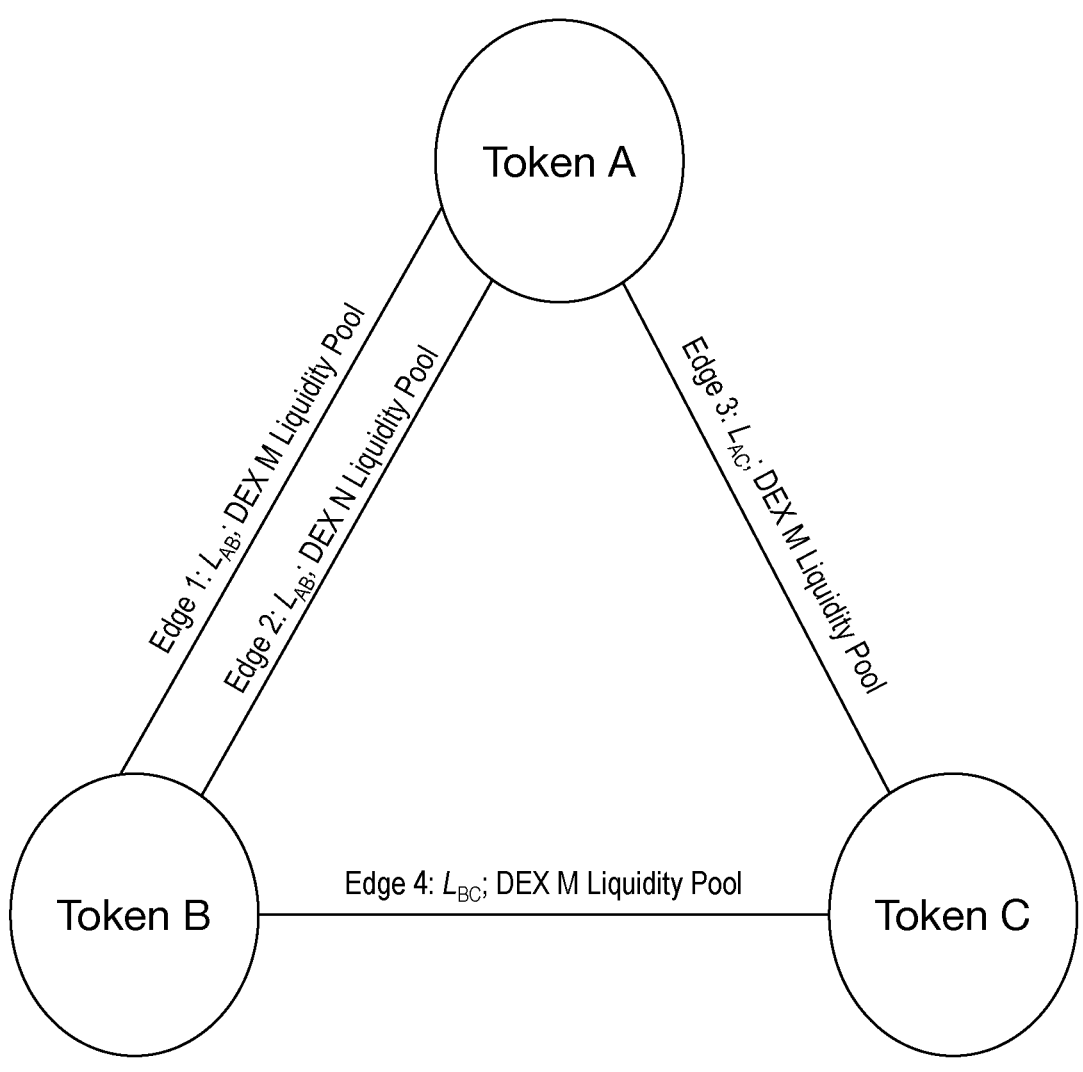
FIG. 6 is an example reference graph representation where each liquidity pool corresponds to a graph edge.

On the reference graph, edges are liquidity sources that allow value of one token to be swapped for value of another according to their automated market maker (AMM) function using liquidity provided by other users or otherwise defined within a smart contract on the DLT source. As shown in FIG. 4, liquidity sources are represented as edges on the reference graph. An edge may be directed or bidirectional, depending on mechanics of the corresponding liquidity source. Liquidity pools may represent constant, or varying exchange rates. Generally, liquidity pools represent state dependent functions that update as tokens are exchanged through the liquidity pool. The exchange rate may additionally change depending on the amount of value being exchanged. Thus, each edge may represent a constant rate or a more complex function (e.g., a convex function) of amount being traded and/or any number of other liquidity source specific state variables. In variations where multiple types of liquidity sources are used, nodes may have multiple liquidity sources connecting them. In some of these variations, as shown in example FIG. 5, multiple liquidity pools may be modeled as a single edge on the reference graph. Alternatively, as shown in FIG. 6, each liquidity pool on the reference graph may be represented by a distinct edge, allowing two nodes to have multiple edges connecting them. Without loss of generality, for simplicity, this document will further on only present examples of the reference graph where each liquidity pool is represented by an edge.

In some versions, liquidity sources involving more than two tokens may be considered. In some cases, such liquidity sources will allow any token in the pool to be swapped for any other token while utilizing a subset of the same set of AMM parameters. In some cases there may be limitations on which pairs of tokens can be swapped. In some implementations, a multi-token liquidity source may effectively function as several independent edges, provided no AMM parameters are reused on the same traversal step. For instance, a three token pool with tokens A, B, and C may be represented as a set of 6 swaps: A→B, A→C, B→A, B→C, C→A, and C→B, so long as only one such swap is used at each point on the traversal in the final selected path. Alternatively, a multi-token pool may be represented as a multi-dimensional edge with multiple inputs and multiple outputs. Without loss of generality, for simplicity, this document will further on only present examples of simple two-token edges in reference graphs and sample graph traversals.

Block S130, which includes determining graph traversal hyperparameters functions to set the constraints for the exchange of the start token for the target token on the reference graph. Determining graph traversal hyperparameters preferably include determining a maximum number of steps S132; thereby setting a constraint on the number of nodes that may be traversed between the start token and the target token, as well as the valid edges at each step. Determining graph traversal hyperparameters may additionally include the calculation and construction of additional data structures, such as calculating and storing the minimum number of edges needed to reach the target token from each node. Thus, edges connecting to nodes whose minimum distance from the target token is greater than the number of steps left (with respect to max steps) are not included in that step of the traversal. Additionally, determining graph traversal hyperparameters S130 may include other limitations, as desired. Examples of other graph traversal hyperparameters include: node traversal cost (e.g., GAS cost on Ethereum), time constraints on graph traversal, desired or undesired intermediary tokens, omission of tokens seeing low usage (as they are unlikely to provide sufficient liquidity to give a better route), etc. In one example, determining traversal hyperparameters includes determining a DLT source state change time frame, comprising the time until the DLT source state is updated.

Constructing a reference graph S120 may not map out all tokens on the DLT source since it is limited by the maximum number of steps. Block S132, which includes determining a maximum number of steps S132, functions to determine the maximum number of steps (i.e., MAXSTEPS) allowed to traverse the reference graph from the start token to the target token. Thus, MAXSTEPS limits the length of swap paths. That is, the number of intermediary nodes for any given swap path is fewer than MAXSTEPS. Considering that the MAXSTEPS may simplify constructing a reference graph S120, and more importantly simplify traversing the reference graph S140, (e.g., by limiting the size and complexity of the traversal), when possible, determining the maximum number of steps S132, may occur prior to, or in conjunction with block S120. Dependent on implementation, MAXSTEPS may be determined by the method and/or input by a user.

Determining a maximum number of steps S132 may be dependent on implementation and any general method for determining a maximum number of steps may be used. For example, in one variation, determining a maximum number of steps S132 may comprise receiving a user input, MAXSTEPS. In another variation, determining a maximum number of steps S132, may comprise iterating the method for different MAXSTEPS, serially or in parallel, until an optimal MAXSTEPS is determined. For example, the method may be implemented first for 1 MAXSTEPS, then 2 MAXSTEPS, 3 MAXSTEPS, etc. up to some maximum amount (e.g., set by transaction cost on the DLT source), and then the best solution found can be taken. In many variations, searching values for MAXSTEPS less than 6 and greater than 1 generally yield the best solutions since this allows enough for complexity but does not consider extra-long paths that would accrue large amount of fees and be expensive to execute on (as well as being expensive to optimize).

In some variations, the method may include pruning edges of the reference graph. Pruning edges of the reference graph functions to simplify the reference graph by removing suboptimal nodes and edges; potentially reducing the complexity of the traversal parameters constructed from exploring the reference graph. Pruning edges of the reference graph may occur any time after construction of the reference graph.

Pruning of the reference graph may be incorporated in any different phase of the method. In some variations, pruning the reference graph may prune lone nodes and corresponding edges, since these nodes cannot be used to route a swap path from the start token to the target token. This may occur directly after construction of the reference graph. Additionally or alternatively, pruning of lone nodes may occur after another pruning that has eliminated connections to a node, effectively making the node a lone node.

In some variations, pruning the reference graph may comprise removing suboptimal edges and associated nodes. Pruning of suboptimal edges may occur in conjunction with traversing the reference graph S140. In some examples, pruning suboptimal edges may occur in conjunction with an iteration of traversing the reference graph; where swap efficiencies for swap paths may be leveraged to determine suboptimal edges. As iterations of the gradient descent are applied to the graph traversal, the distribution of token values sent along each edge may increase or decrease. Once the token value sent along a certain edge decreases below a certain threshold (e.g., 001% of the token value of the originating node), that edge and potential corresponding nodes may be pruned from the reference graph.

In some variations, pruning the reference graph may comprise removing suboptimal swaps. Pruning suboptimal swaps may occur in conjunction with traversing the reference graph S140. Removing suboptimal swaps may be similar to removing suboptimal edges. In these variations, an edge may allow sufficiently optimal swaps at certain stages of a traversal and may enable suboptimal swaps at other stages of the traversal. Removing suboptimal swaps may thus enable removal of specific swaps along an edge while allowing other swaps along the same edge.

In some variations, pruning the reference graph may comprise pruning edges or swaps with insufficient liquidity. In these variations, edges representing liquidity sources that do not contain sufficient liquidity for a desired token swap amount may be removed. Pruning edges or swaps with insufficient liquidity may occur directly after the constructing the reference graph S120, after determining traversal parameters S130, and/or during or after traversing the reference graph.

Block S140, which includes traversing the reference graph functions to iteratively examine all relevant traversals (i.e., swap paths) from the start token to the target token on the reference graph, thus "exploring" the reference graph. Traversing the reference graph S140 includes executing all swap paths for the given traversal step S142 and then determining a swap efficiency for all swap paths S144 of the given traversal step. Blocks S142 and S144 are called iteratively, wherein for each iterated traversal step, the constructed swap path are incremented towards the more efficient swap paths as determined from the prior iteration. In this manner, traversing the reference graph S140 comprises a stepwise loop, where token values are initially distributed evenly, randomly, or in some other computationally cheap method, between all traversal paths, and then, per each traversal step, incremented towards the more efficient traversal paths. individual swap path steps are taken, node to node, from the start token to the target token and the path step efficiency of each path step is evaluated. The stepwise loop is limited by MAXSTEPS. Thus MAXSTEPS determines the scope of the reference graph exploration. For variations that include multiple start tokens, all swap paths include all possible swap paths from each start token to the target token, wherein each possible swap path includes fewer intermediary nodes than the maximum number of steps. For variations that include multiple start tokens and/or multiple target tokens, the all swap paths include all possible swap paths from each start token to each target token (that is within the MAXSTEPS range of the target token), and the select swap path includes at least one swap path from all start tokens to at least one target token.

Figure 7:
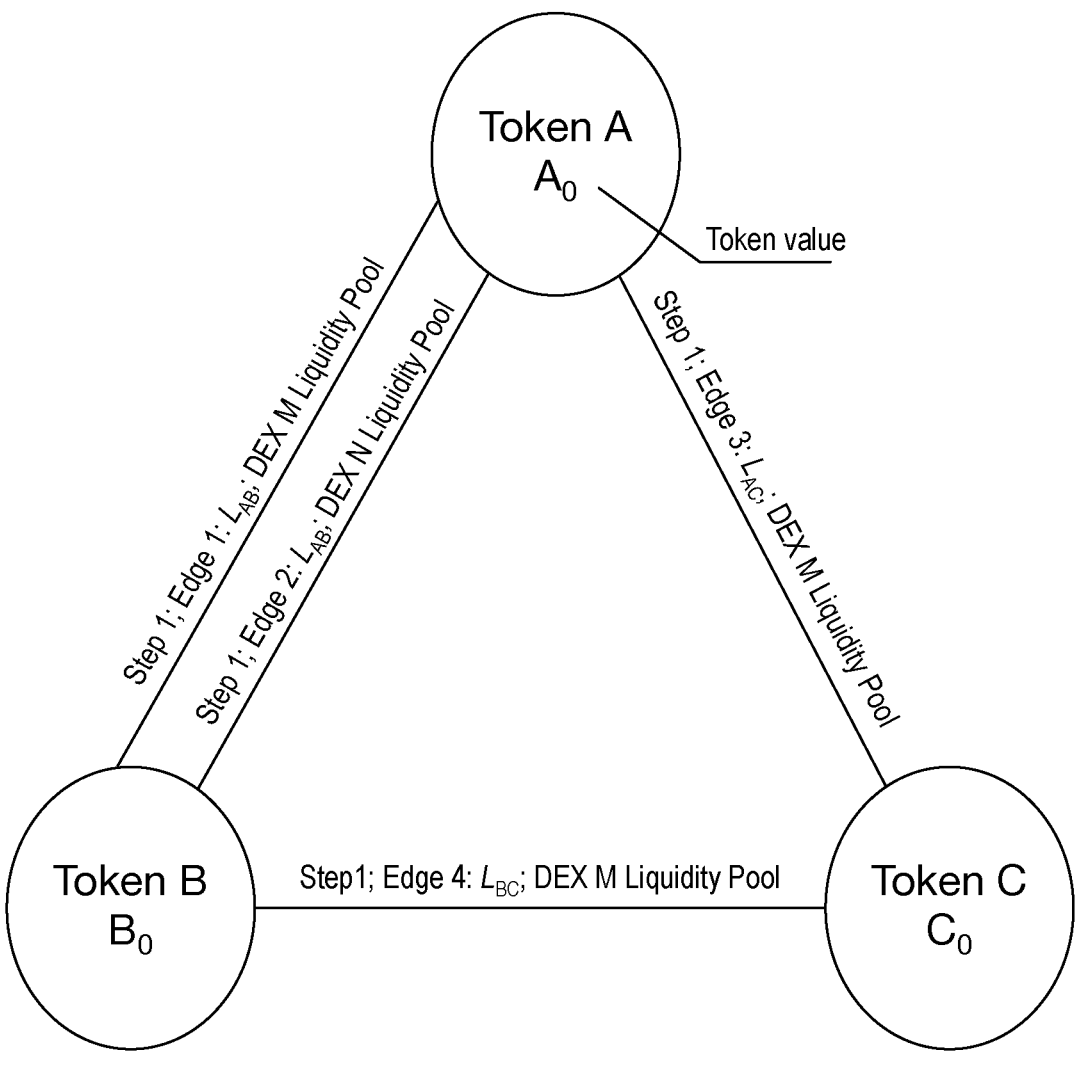
FIG. 7 is a generalized example of a possible first swap group of the constructed traversal.
Figure 8:
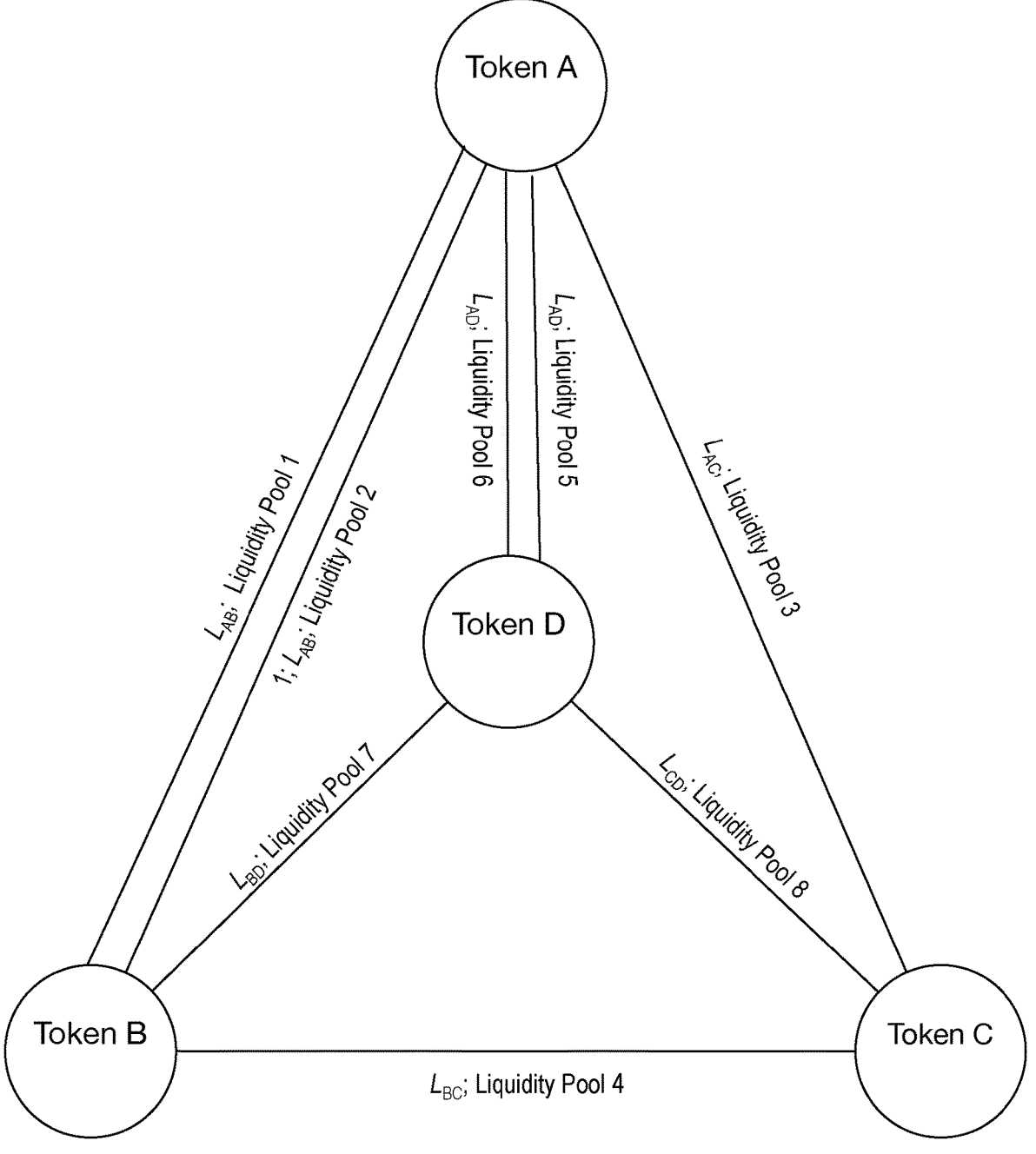
FIG. 8 is an example reference graph representation with four nodes.

Block S142, which includes executing all swap paths, functions in determining and constructing all possible traversals from the start token(s) to the target token(s). Executing all swap paths S142 may comprise a step-wise process of traversals from the start token to all neighboring nodes. Generally, constructing all swap paths may thus comprise taking path steps, where each path step includes taking all nodes with a positive token value (referred to as origin nodes) and splitting/distributing the token value of each origin node along all connected edges and transferring the token value to all connected nodes (referred to as destination nodes) by going through each edge's corresponding "amount out" function. This can serve to simulate propagating potential exchanges to evaluate impacted token value for a given potential executed exchange. Initially, as shown in example FIG. 7, only the start token(s) has a non-zero value. Taking the initial path step (from step=0 to step=1) includes splitting the start token value and transferring it to all neighboring nodes. Thus, for example FIG. 7, the token value of token A is split along edge 1, edge 2, and edge 3 and eventually transferred to token B and token C. In another example, as shown in FIG. 8, the token value of token A is split five ways: two edges going to token B, one edge going to token C, and two edges going to token D. Taking the initial path step (from step=0 to step=1) includes splitting the start token value and transferring it to all neighboring nodes. Thus, for example FIG. 7, the token value of token A is split along edge 1, edge 2, and edge 3 and eventually transferred to token B and token C. In another example, as shown in FIG. 8, the token value of token A is split five ways: two edges going to token B, one edge going to token C, and two edges going to token D.

It should be noted that the liquidity pools (edges) are AMM functions obtained from the liquidity sources on the DLT source (e.g., a DEX.) These functions may be dependent on the token properties (e.g., smart contract rules), the amount of token exchanged through the associated liquidity pool, and other local parameters of the liquidity source (e.g. local variables in the DEX smart contract). As shown in example FIG. 9, these edges may be mathematically represented as rank 4 logit tensors $L^{\alpha\beta\mu\nu}$, where the indices refer to: the path step number ($\alpha$), the origin node of the edge ($\beta$), the destination node of the edge ($\mu$), and the liquidity pools (e.g., DEX) ($\nu$). The path step number ranges from 1 to MAXSTEPS. The origin node and destination node values range from 1 to S, where S is the total number of tokens on the reference graph. The liquidity pools range from 1 to T, where T is the total number of liquidity pools, or liquidity sources, the method is using. The tensor representation for the edges of example FIG. 7, for a 3 step traversal, is shown in FIG. 8.

In taking a path step, each origin node token value is split between all edges to neighboring destination nodes. Any distribution function may be used to split the value of the origin node between all neighboring nodes. In one variation, the origin node token value is divided evenly along all paths. For example, the token value of the origin node is split/divided evenly by three to pass to three destination nodes. In another variation, a 'SoftMax' function is taken over each origin node tensor dimension, such that the token value at that node can be split proportionally. The amount sent along each edge may then be the output of the SoftMax function multiplied by the token value of the origin node. The amount sent along each edge is then passed into that edges AMM function. In other variations, any desired distribution may be utilized in splitting origin node token values. The method of splitting the values of nodes may be changed over iterations. For example, in an initialization iteration, splitting the token value may include dividing the value evenly.

Block S144, which includes determining a swap efficiency for all swap paths S144, functions to evaluate the current step swap paths and determine the comparative favorability of all traversed edges of the current path step. In many variations determining a swap path efficiency for all swap paths S144 includes applying a gradient descent to all swaps traversed during the current reference graph traversal thereby calculating all traversal parameters of all swap paths of the current step. In many variations, the gradient descent is determined with respect to the same dimensions as the edge tensors. For example, for each edge of a swap path, the gradient descent may be calculated across dimensions of the origin node, destination node, path step, and potentially liquidity source (e.g., origin DEX of the edge). Determining a swap path efficiency for the step may occur concurrent, or after executing all swap paths. That is, for each path step traversed during block S142, a complementary sub-step of block S144 may occur concurrently.

Swap path efficiencies may be used in further iterations of traversing the reference graph S140. That is, the swap efficiencies of each swap path may be incorporated in how later iterations of swap paths are generated. In variations that include a SoftMax function, the SoftMax function may incorporate the prior iteration swap efficiencies to determine the distribution of token values between neighboring nodes. For example, in a first iteration of traversing the graph S140, the SoftMax function may evenly divide the token value of an origin node between all destination nodes. On later iterations, the SoftMax function may use the swap efficiencies of the edge traversals from the origin node to destination nodes, of the prior iteration to distribute the token values. In this manner, a gradient descent efficiency, may iteratively maximize (or minimize) favorable swap paths.

Determining a swap path efficiency for all swap paths S144 may be used for pruning suboptimal paths of the reference graph. Pruning suboptimal paths may simplify and speed up graph traversals. As block S144 determines the relative favorability of each edge, pruning paths of the reference graph may be called to prune edges, swaps (and their associated traversal parameters), that are determined to be sufficiently unfavorable. This may be because the amount of value traveling along the edge at a certain step is negligible, or the value may be non-negligible but the edge does not provide as much value as it costs in gas to include in the transaction. Dependent on implementation the edge may be pruned immediately, or after the traversing the reference graph S150 has been completed.

Pruning the reference graph or traversal parameters may remove the unfavorable edge or swap as soon as it is determined unfavorable. For example, in the proportion of token "flow" through each node, edge, or swap may be used to remove nodes, edges, or swaps. That is, the proportion of the original token input amount flowing through each node, edge, or swap is calculated. Nodes, edges, or swaps below a certain proportion of flow may then be pruned. Additionally or alternatively, the gradients of flow through each node, edge, or swap may be used to determine pruning. In pruning variations, the taken path step may be reset and taking a path step may be called to repeat the same path step but without the unfavorable node, edge, or swap where the token value would be normalized taking into account the removed node, edge, or swap. Executing all swap paths may then repeated for the same step. If all nodes, edges, and swaps of the step are then determined to be sufficiently favorable, then the next iterative step-wise process of traversing the reference graph S140 is continued.

Block S150, which includes determining a select swap path, functions to determine a "best" set of paths from the start token to the target token. Block S150 may leverage all swap efficiencies determined from block S144 in determining a select swap path. More specifically, the stepwise gradient descents applied at each path step (edge) may be used to select one, or more swap paths, from the start token to the target token.

FIGS. 7 and 9-13 provide a simplified example of traversing a reference graph comprising: three nodes, token A, B, and C; located on two DEXs, DEX M and DEX N on a single blockchain, where all three nodes are interconnected. The general tensor formulation for the traversal parameters is provided in FIG. 9. In some implementations an explicit representation of this tensor format may be used, while in other implementations an implicit representation may be used; e.g., a sparse tensor representation may be used, wherein only tensor elements not equal to —infinity is kept track of, and all other parameters are implicitly assumed to be —infinity. For simplicity, pruning of the reference graph and/or traversal parameters will not be implemented. Splitting of token values may be incorporated by a distribution between all connected edges. For example, a SOFTMAX function may be implemented to split the value of each token to transfer to each edge.

Figure 10:
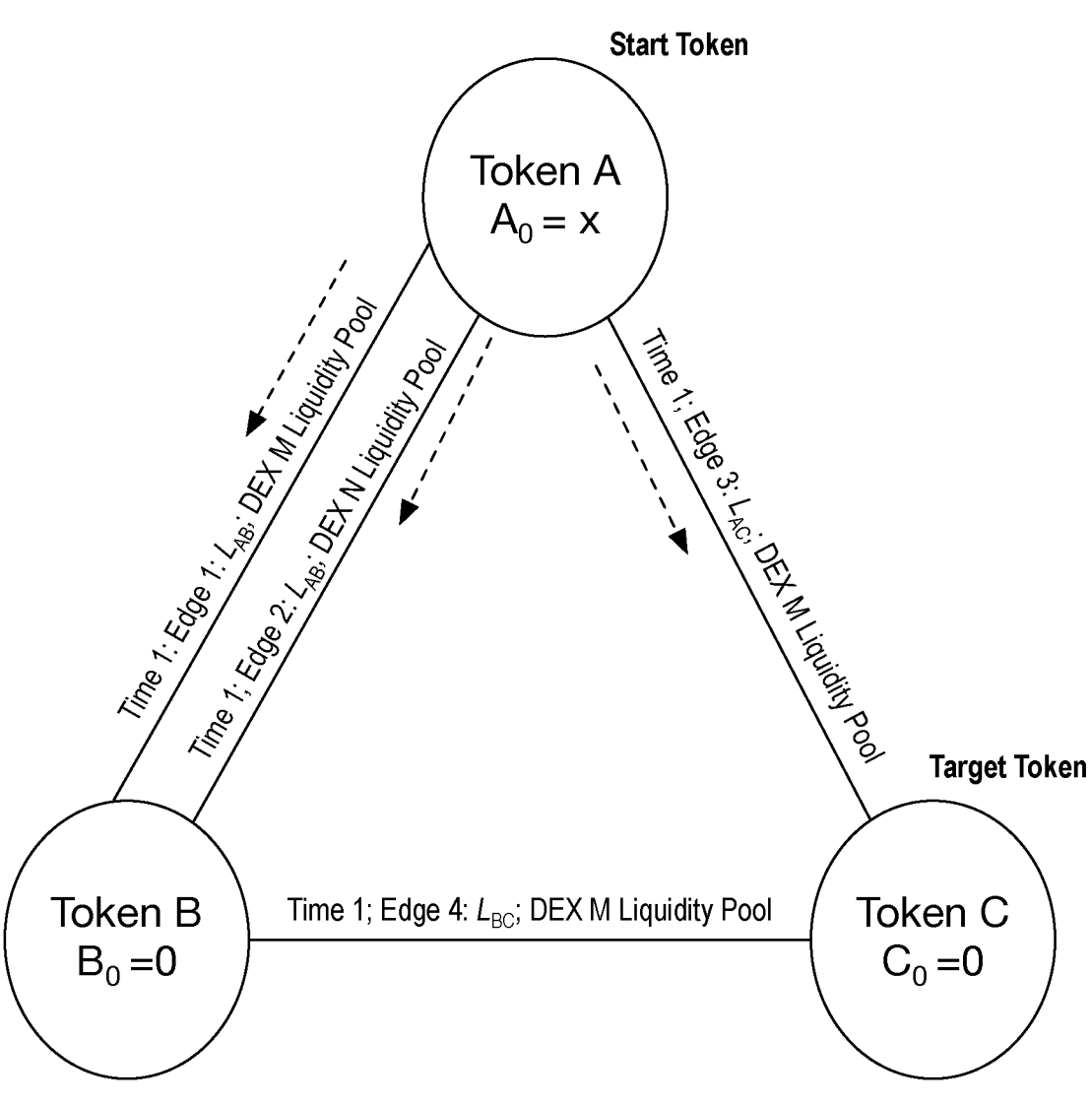
FIGS. 10-13 are a first example reference graph traversal.
Figure 11:
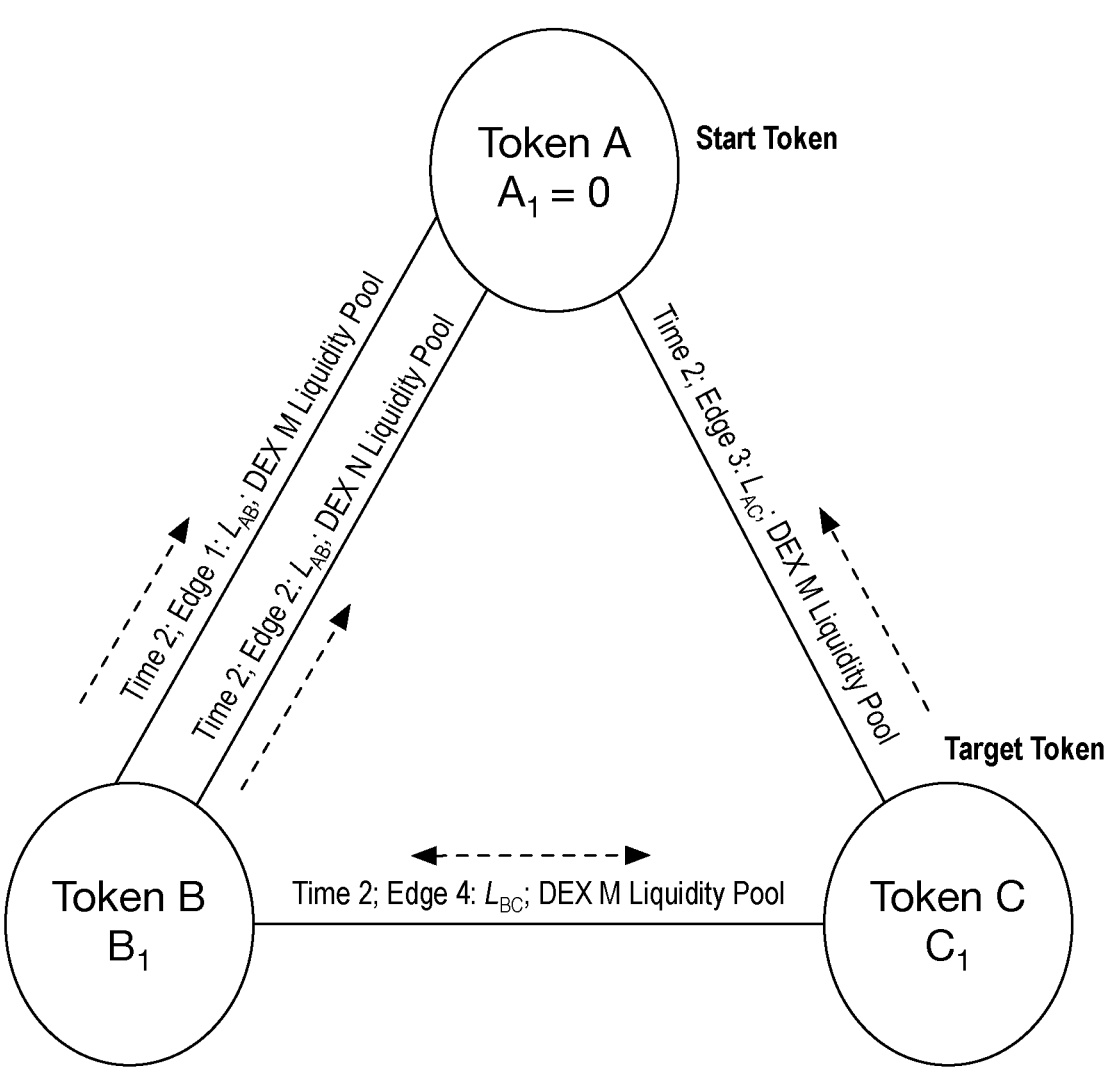
Figure 12:
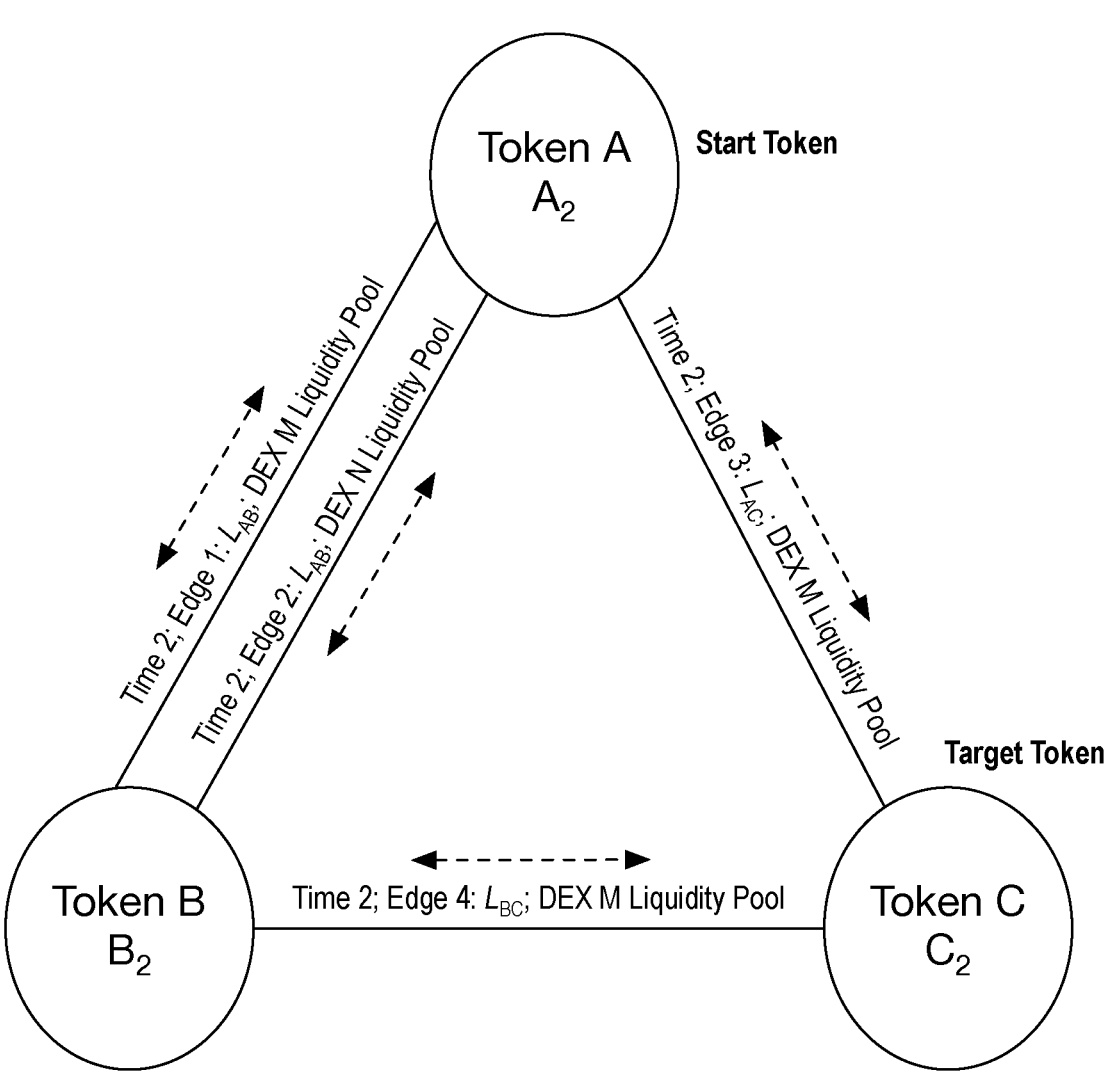
Figure 13:
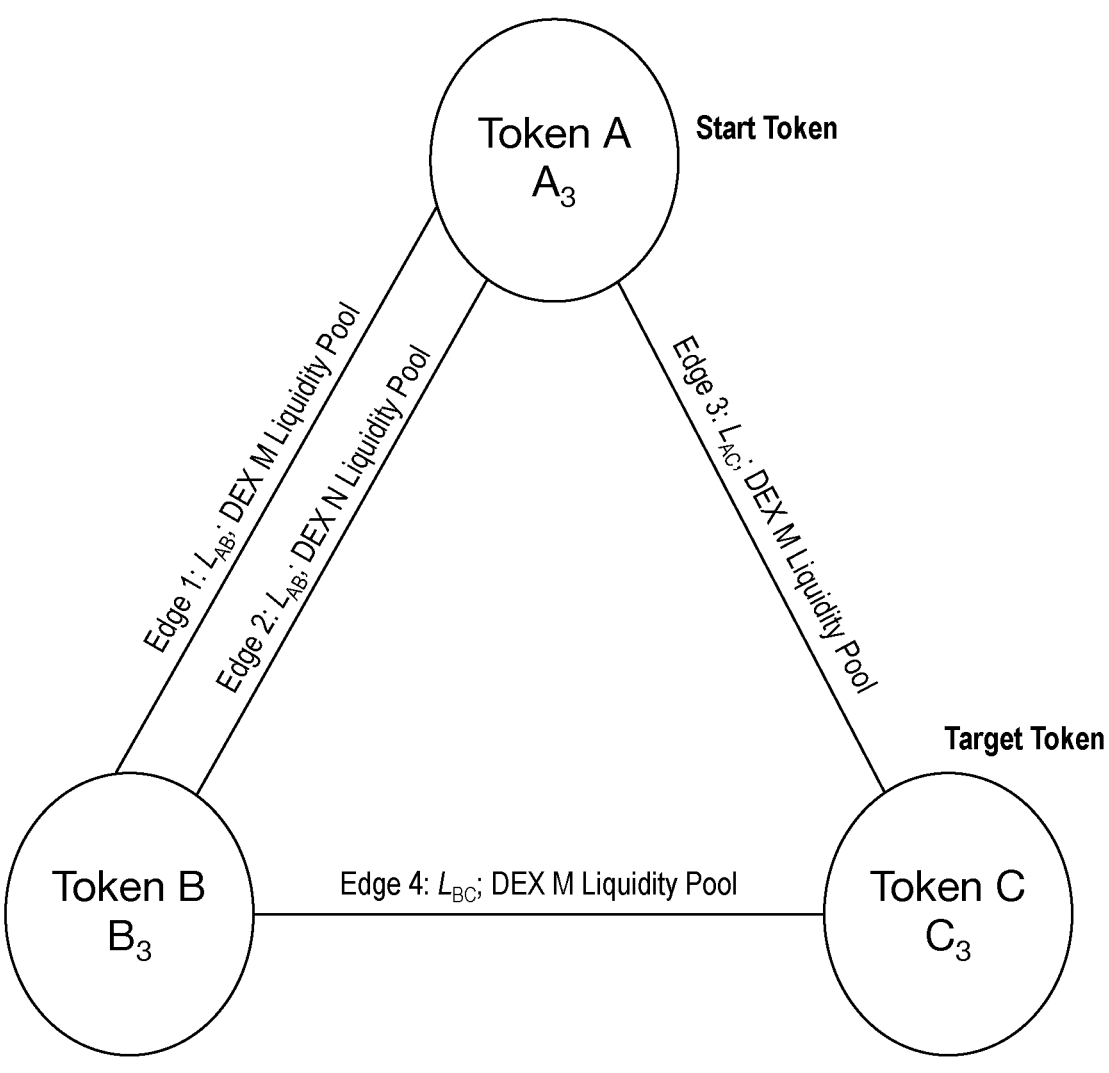

As shown in FIG. 10, at the initial stage, only the start token A has a non-zero value. Thus, the initial path step, as shown in FIG. 10, comprises splitting the start token value between all edges connected to token A, sending value to token B and token C. It should be noted that in implementations that include only a single start token, after the first path step, the value of the start token is approximately 0. As shown in FIG. 11, the second path step includes splitting token B (e.g., by using a SOFTMAX function), to send to token C and back to token A; and splitting token C, to send to token B and back to token A. As shown in FIGS. 12, for path step 3, all tokens are sent to all neighboring tokens. As shown in FIGS. 13, after the final path step, since the appropriate paths have not been pruned, all tokens may have non-zero values.

Figure 15:
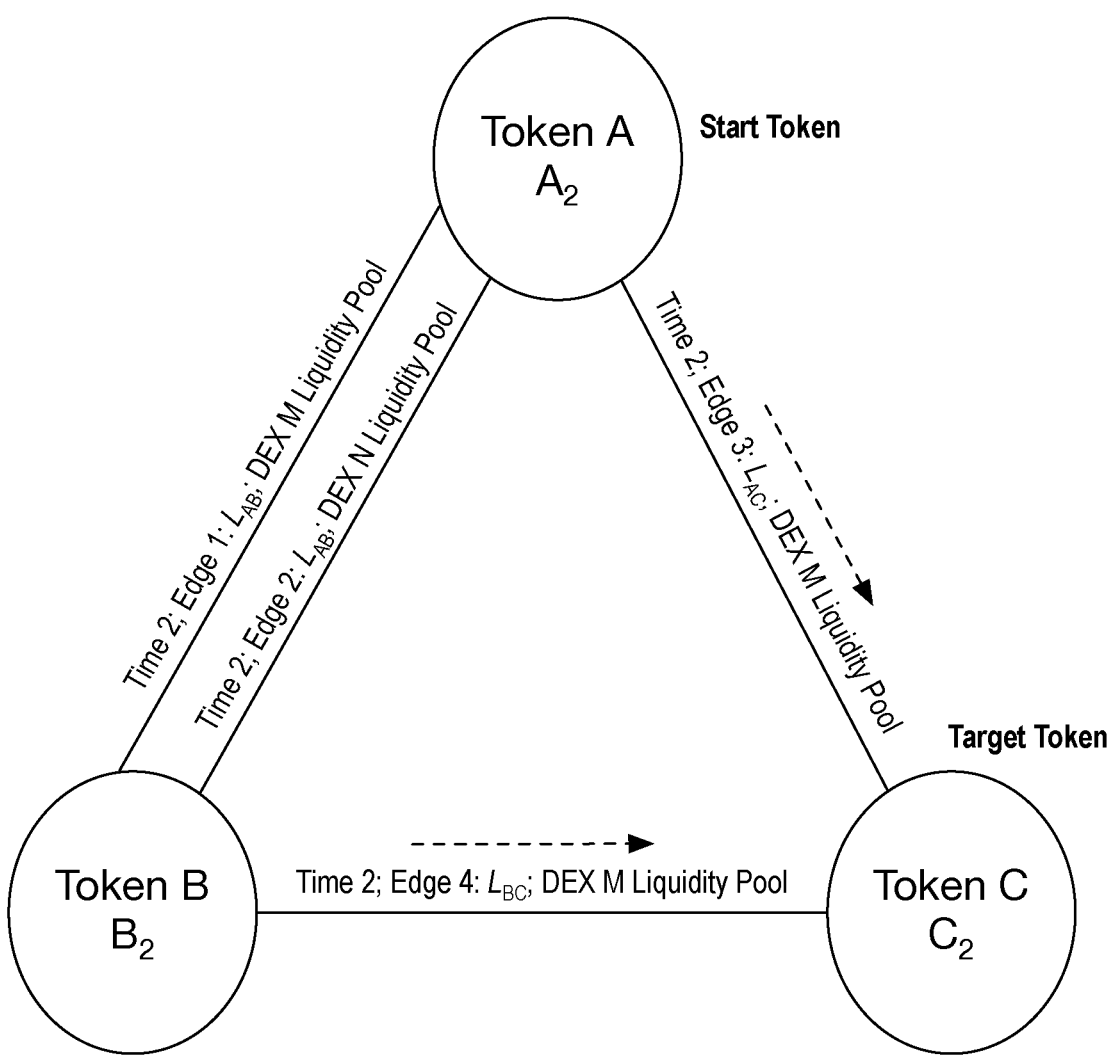
Figure 16:
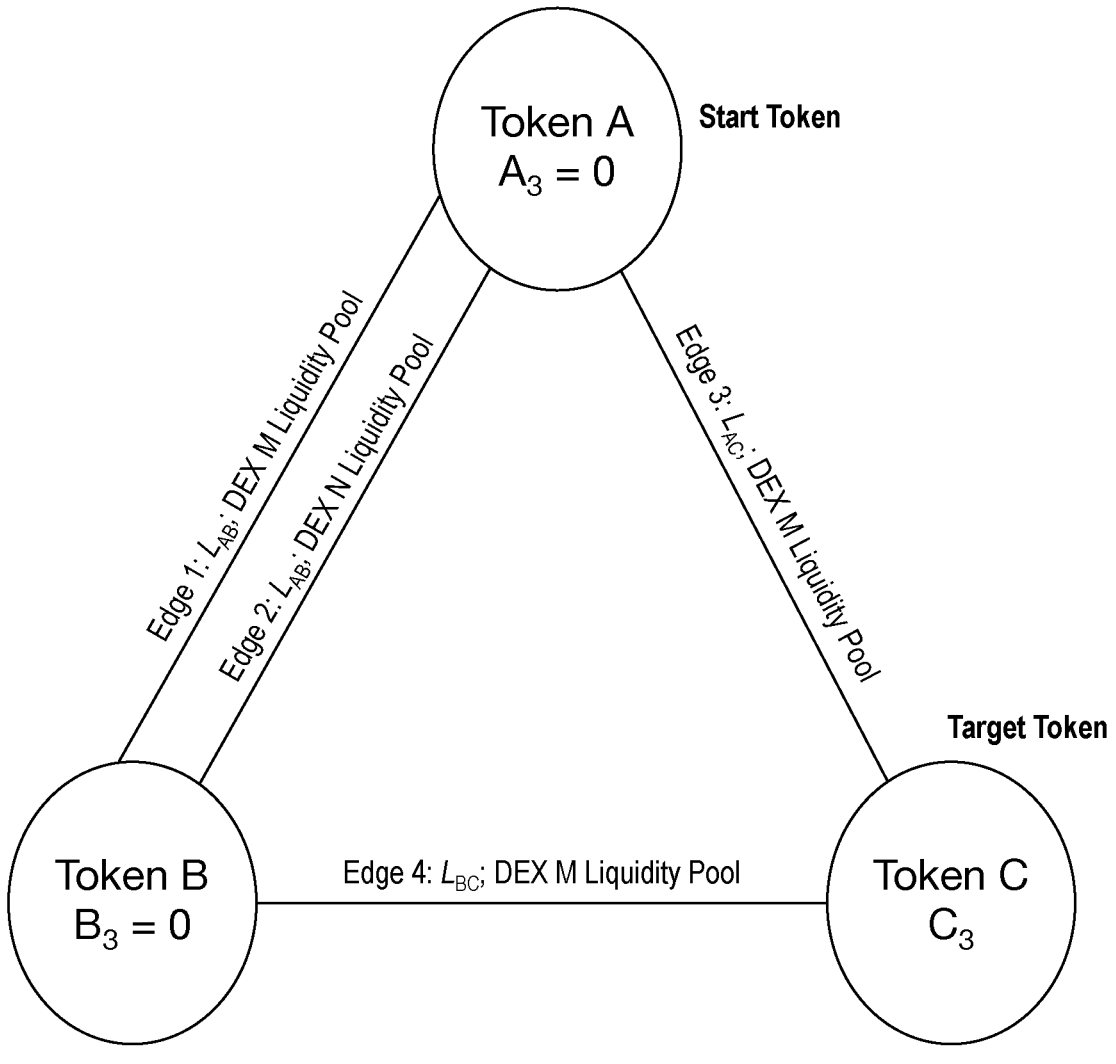
Figure 17:
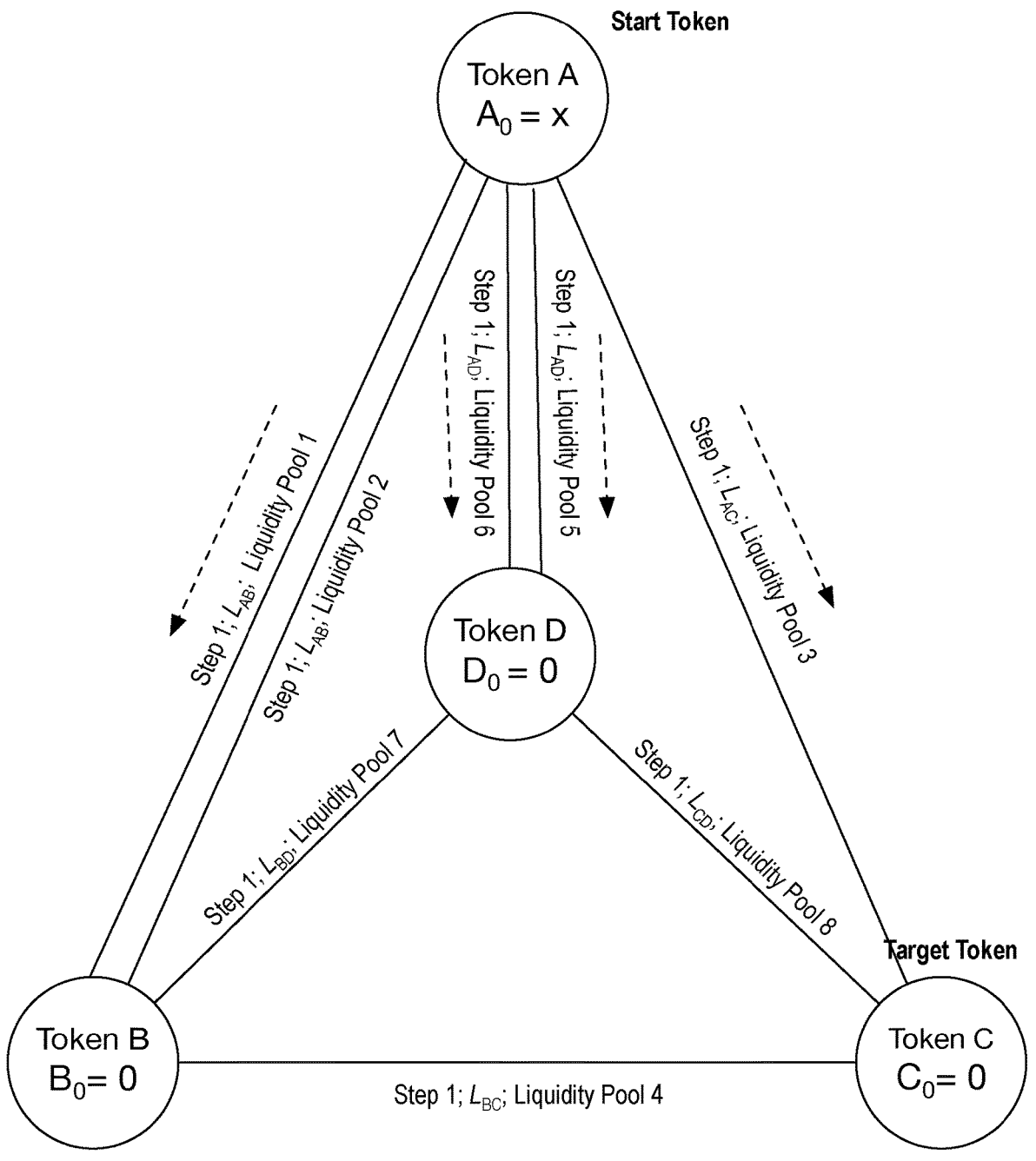
FIGS. 17-19 are a second example of a reference graph traversal with four nodes.

In a general implementation of the method at least a pruning of the reference graph will be implemented prior to traversing the reference graph S150 (In many variations, the reference graph will be constructed directly in this fashion and pruning is not necessary). Once this initial pruning is completed the reference graph traversal may be constructed. As shown in FIG. 14, certain swaps in the reference graph traversal may be removed to improve the calculation, or because they can't be traversed on that step while satisfying all traversal rules. In many implementations the edges are not actually removed, but set to a value such that a traversal along that edge would not occur (e.g., set to negative infinity for this example calculation) dependent on the start token, target token, and the maximum number of steps. For the initial path step, edges not originating from the start token may be removed. Since after the path step the start token value is relatively zero, for the second path step, originating from the start token may be removed. Since only the target token should be non-zero after the final path step, all swaps not ending at the target token should be removed. More generally, for larger more complex graphs, pruning the reference graph traversal should remove swaps whose destination token would take more swaps to reach the target token than would be allowed by the MAXSTEPS parameter. In many implementations pruning swaps that do not satisfy the traversal parameters are done during construction of the traversal. As set by the chart in FIG. 14 and the graph shown in FIG. 15 prior to the final path step, only the edges leading to the target token are allowed; thus, as shown in FIG. 16, only the target token is non-zero.

Figure 18:
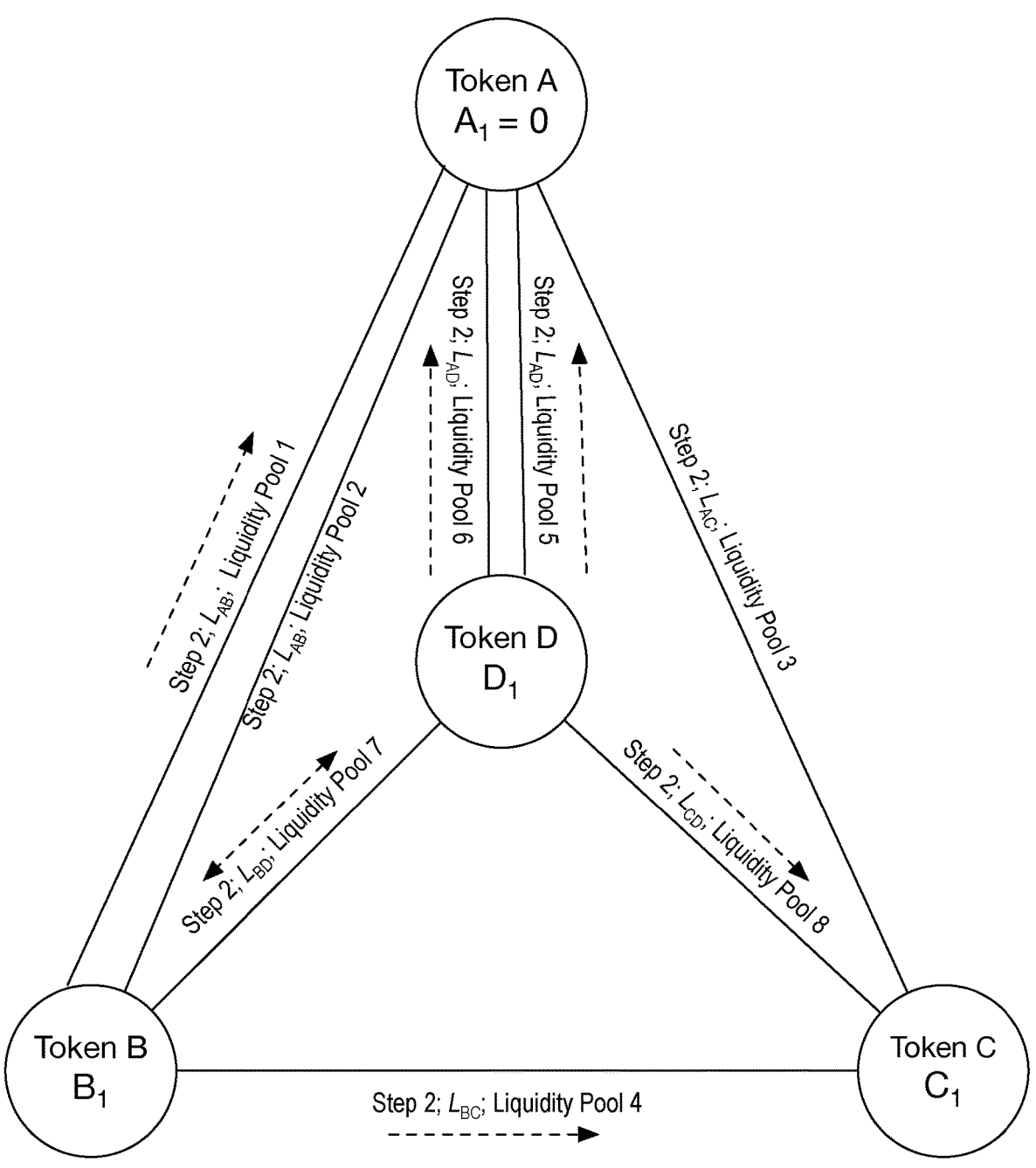
Figure 19:
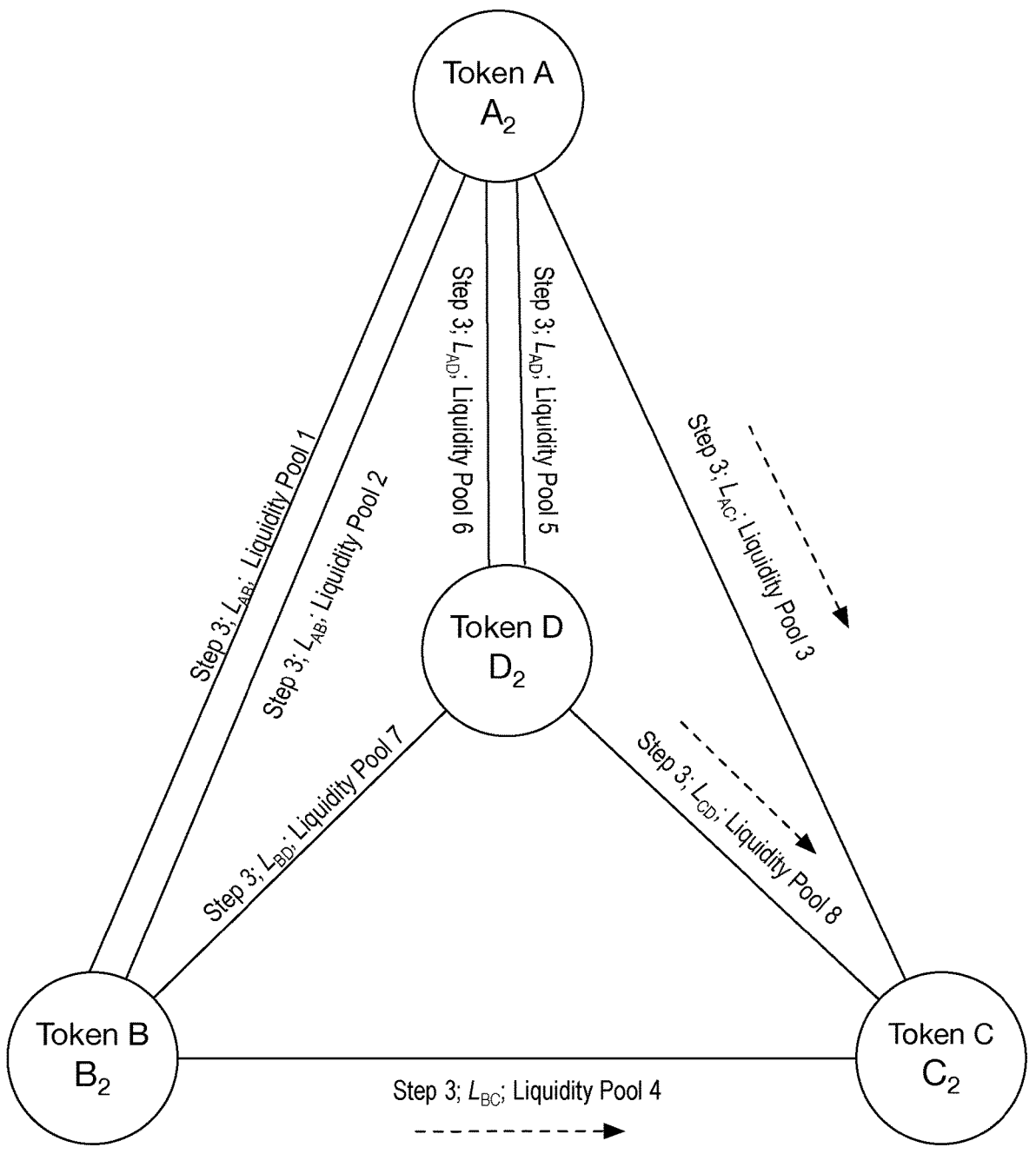

In another example, for four interconnected tokens, as shown in FIGS. 8 and 17-19; the reference graphs are shown with unnecessary edges already removed. Starting with a start token (A), the value of token A is split between neighboring edges, with value ending up at all connected nodes (token B, token C, and token D). Since the value of token A is now 0, all other tokens split their values between their neighboring edges, with value ending up at the connected nodes. That is, token B, splits its value between swaps going to token A, token B, and token D; token C does not split value since it is the target token; and token D splits its value between swaps going to token A, token B, and token C. As shown in FIG. 18, right prior to the final step, there are additional restrictions on graph traversal, such that for the final path step all tokens only send their value through swaps going to token C.

Figure 20:
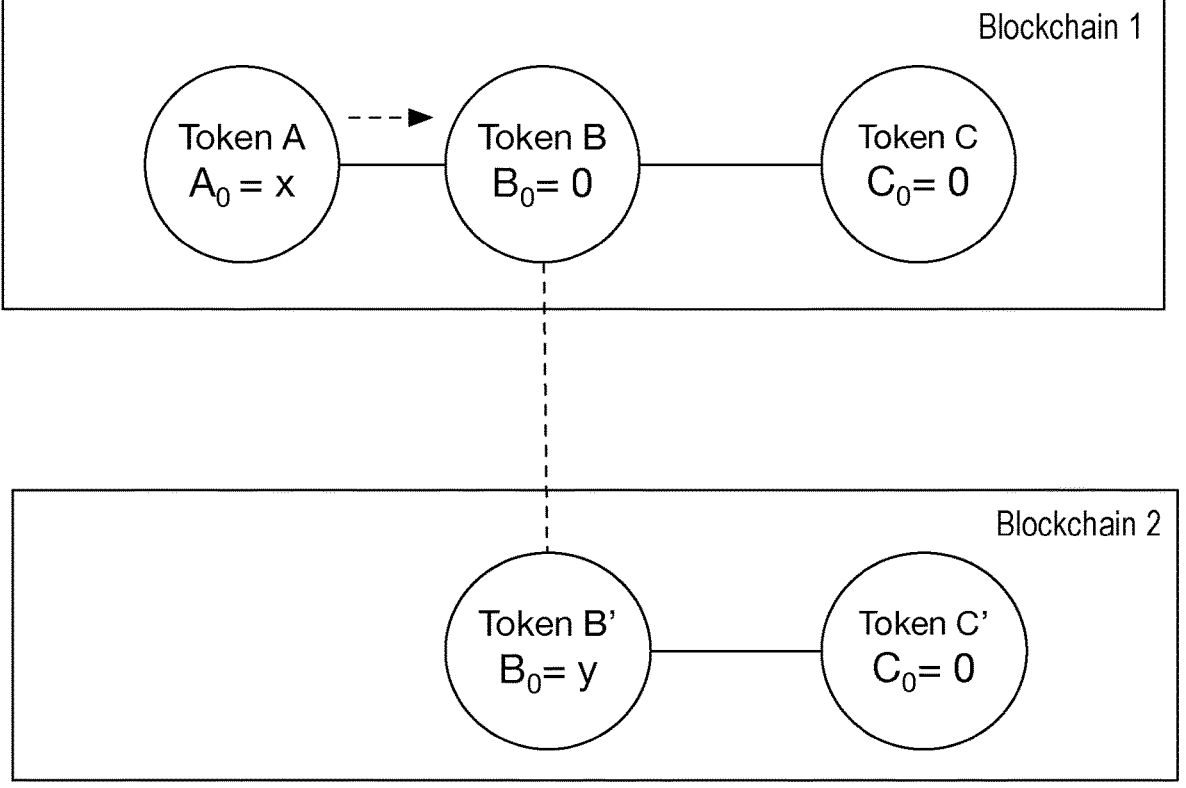
FIGS. 20-22 are a third example of a reference graph traversal of nodes on two different blockchains.
Figure 21:
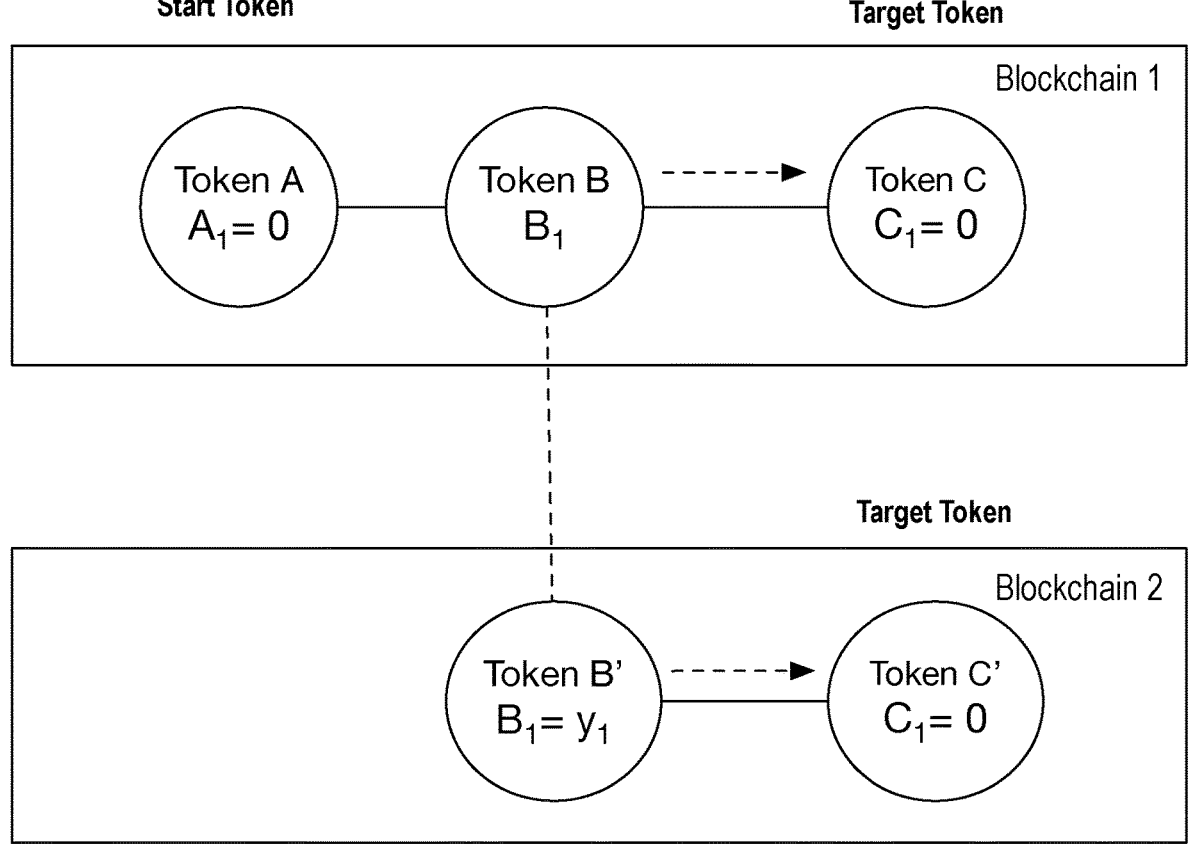
Figure 22:
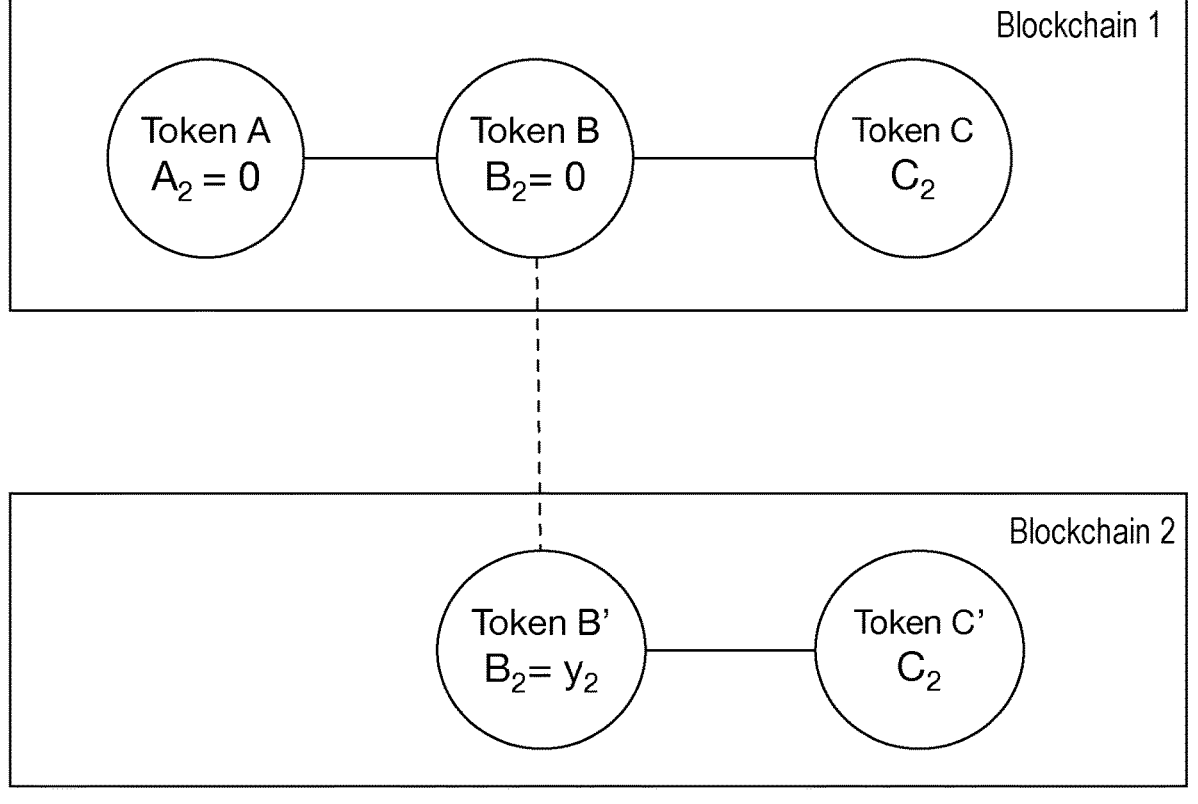

In a third example, as shown in FIGS. 20, 21, 22, three tokens are linearly connected on two separate blockchains, with start token A and target token C (referred to as token C' on the $2^{nd}$ blockchain) for a two-step process. In this variation, two of the tokens are located on both the first and second blockchain. In these variations, connecting to a DLT source connects to multiple DLT sources to obtain token data, and constructing the reference graph constructs a reference graph spanning the multiple DLT sources. As part of a blockchain implementation, the method further requires that the user has tokens on both blockchains (e.g., a user has a wallet with tokens on both blockchain 1 and blockchain 2), or that the routing contract on each blockchain can acquire its respective required amount of starting token through another method. Thus, although token A is the start token, token B' must also have a non-zero value to enable exchanges on the $2^{nd}$ blockchain. As the first path step the value of token A is sent to token B on the $1^{st}$ blockchain. As shown in FIG. 21, the second path step includes sending the token value of B (and B') to token C (and C'). As done previously, a SOFTMAX function may be implemented to divide the value of token B between token C and token C', with the additional constraint that for this exchange to occur, the value of token B' is greater or equal to than the amount that is desired to be sent to token C'. Because the actual path exchange is still from token A to token C (and C'), the final value of token B' may not in fact be zero, but simply the difference of the initial value of token B' and the amount of token B sent to token C'.

3. System Architecture

The systems and methods of the embodiments can be embodied and/or implemented at least in part as a machine configured to receive a computer-readable medium storing computer-readable instructions and an external communication device. The instructions can be executed by computer-executable components integrated with the application, applet, host, server, network, website, communication service, communication interface, hardware/firmware/software elements of a user computer or mobile device, wristband, smartphone, or any suitable combination thereof. The communication device is specifically configured to send and receive computer-readable instructions to and from blockchain platforms. Communication may be through proprietary protocols, APIs, web browser, or any other form of appropriate communication. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, cloud storage systems, or any suitable device. The computer-executable component can be a processor but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: at a communication interface, connecting to a DLT source; at a storage medium constructing a reference graph; at a processor system configured to perform continuous iterative processing of a graph, traversing the reference graph; at a processor system configured to perform continuous iterative processing of a graph, pruning the reference graph, thereby removing negligible paths from the reference graph; and at a processor system configured to perform continuous iterative processing of a graph, applying a gradient descent to the graph traversal.

Similarly, in another variation, a non-transitory computer-readable medium storing instructions that, when executed by one or more computer processors of a computing platform, cause the computing platform to perform operations of the system or method described herein such as: at a communication device, connecting to a blockchain or other database to read the state of one or more liquidity sources; at a storage medium constructing an reference graph; at a processor system configured to perform continuous iterative processing of a graph, traversing the reference graph; at a processor system configured to perform continuous iterative processing of a graph, pruning the reference graph, thereby removing negligible paths from the reference graph; and at a processor system configured to perform continuous iterative processing of a graph, applying a gradient descent to the graph traversal.

Figure 23:
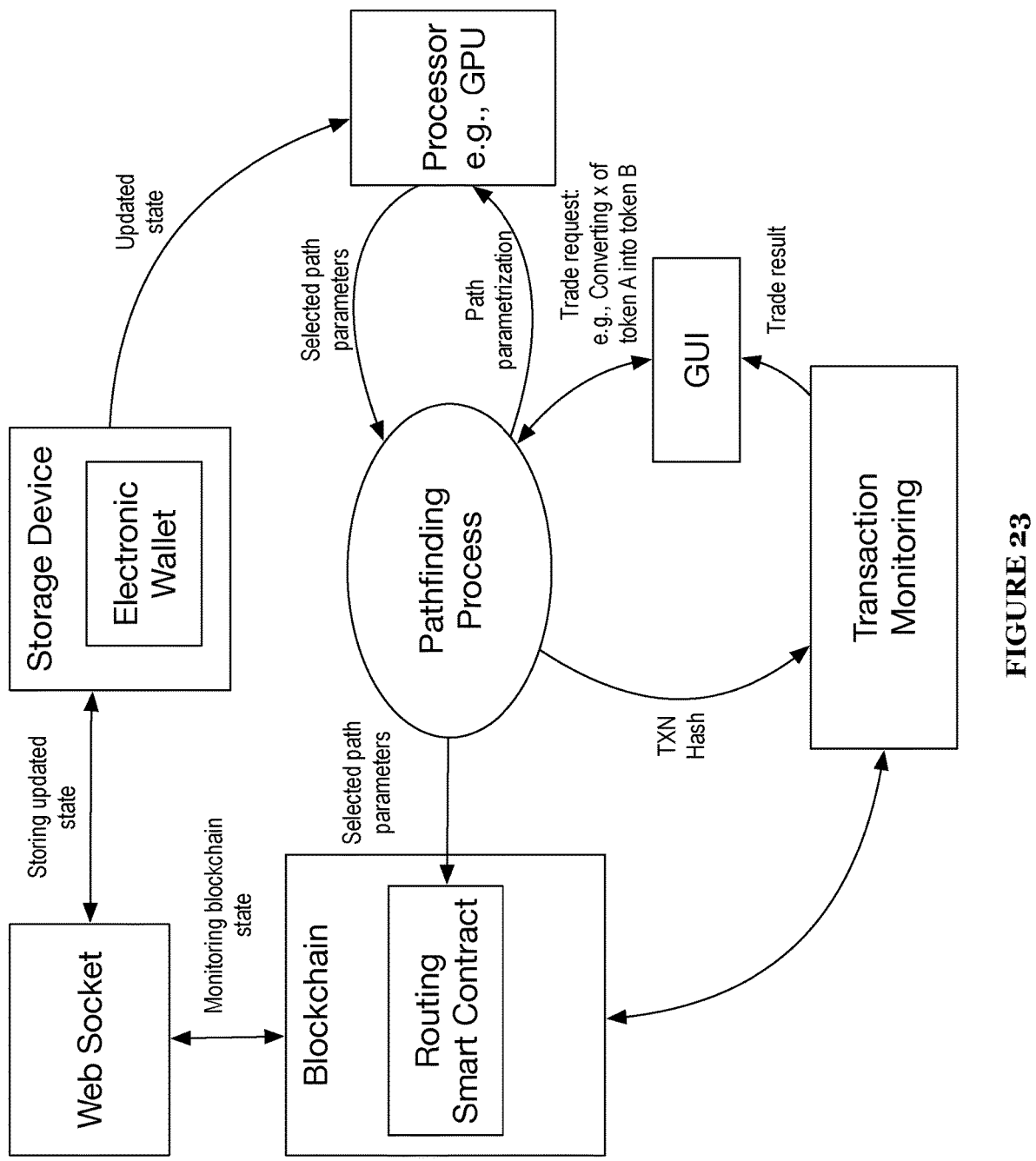
FIG. 23 is an exemplary system architecture that may be used in implementing the system and/or method.
Figure 24:
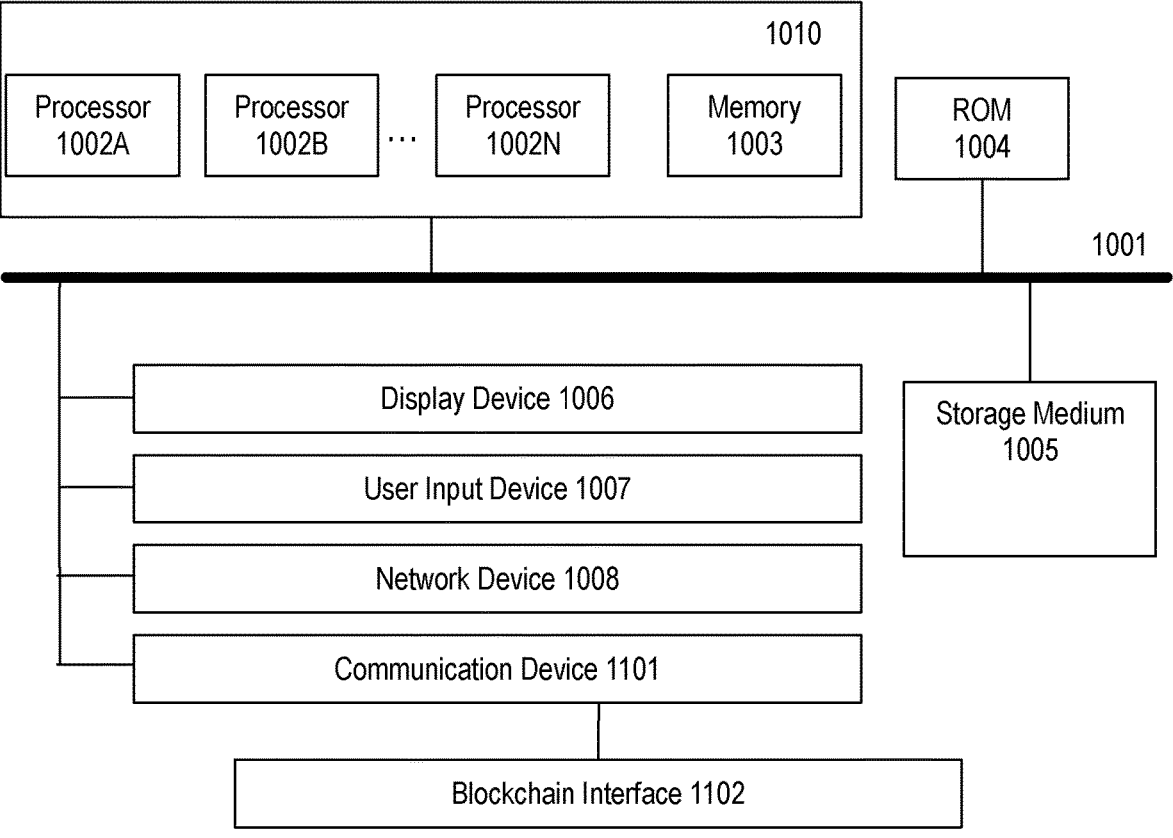
FIG. 24 is a second example architecture that may be used in implementing the system and/or method.

FIGS. 23 and 24 are exemplary computer architecture diagrams of two implementations of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting a communication device 1101 that includes a blockchain interface 1102, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

In one example system architecture implementation, as shown in FIG. 20, the method may be implemented on a processor (e.g., a GPU) as an automatic market maker (AMM) pathfinding process for blockchain liquidity sources. The state of the liquidity sources may be set by connecting to a node in the blockchain's network and sending read requests for the states of the liquidity sources being considered, storing the result in a local storage medium readable by the pathfinding process. The selected path parameters and path parametrization may be set by the user interacting through a GUI, or by the process itself. A monitoring system connected to the node in the blockchain's network is used to monitor the state of the blockchain using web sockets; this system may be used to update the state stored on the local storage media, or to monitor order routing transactions. Transactions may furthermore utilize code already existing on the blockchain as smart contracts. Additionally, the system may include a storage device for the storage of private keys corresponding to the ownership of token balances on the blockchain (e.g., a wallet). Usage of the system may additionally require the user to approve the routing contract already existing on the blockchain to withdraw the desired amount of the start token from the user's balance.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

I claim:

1. A method for a token swap path execution on one or more distributed ledger technology (DLT) sources, comprising:

connecting to a DLT source, thereby retrieving DLT source state data and monitoring real-time blockchain state changes;

constructing, from the DLT source state data, a reference graph, comprising nodes and edges, wherein each node represents a token on the DLT source and has a non-negative token value, and wherein a start token is the only token that has an initial positive token value, and wherein each edge connects a pair of neighboring nodes and represents a state-dependent automatic market maker (AMM) function that updates as tokens are exchanged through the liquidity pool and is dependent on token properties including smart contract rules;

determining traversal hyperparameters for the reference graph, including determining a maximum number of steps, corresponding to a maximum number of path steps that can be taken for a swap path to traverse the reference graph from the start token to a target token, and determining a blockchain state change time frame comprising a time period until the DLT source state is updated;

at a processor system configured to perform iterative processing, iteratively traversing the reference graph within the blockchain state change time frame, therein calculating swap efficiencies for swap paths between the start token and the target token, wherein each iteration comprises:

from the start token to the target token, executing all swap paths, wherein each swap path includes fewer intermediary nodes than the maximum number of steps, and wherein executing swap paths comprises applying the state-dependent AMM functions, and for all swap paths, determining a swap efficiency; and determining a select swap path based on all swap efficiencies within the blockchain state change time frame.

2. The method of claim 1, wherein the select swap path comprises one, or more, swap paths between the start token and the target token.

3. The method of claim 2, wherein determining a swap efficiency for all swap paths comprises calculating a gradient descent step to adjust the parameters defining the traversal of the reference graph.

4. The method of claim 3, wherein a gradient descent is calculated across the dimensions of the origin token, destination token, and path step.

5. The method of claim 4, wherein the gradient descent is further calculated across the dimension of the liquidity source.

6. The method of claim 5, wherein the start token comprises at least one start token, such that:

the initial values of all start tokens are positive;

all swap paths include all possible swap paths from each start token to the target token, wherein each possible swap path includes fewer intermediary nodes than the maximum number of steps; and the select swap path includes at least one swap path from each start token to the target token.

7. The method of claim 6, wherein the target token comprises at least one target token, such that:

the all swap paths include all possible swap paths from each start token to each target token; and the select swap path includes at least one swap path from all start tokens to at least one target token.

8. The method of claim 1, wherein connecting to the DLT source updates periodically after each state change and constructing a reference graph updates the reference graph according to the DLT source state change.

9. The method of claim 8, wherein connecting to the DLT source connects to multiple DLT sources such that tokens are located on different DLT sources and constructing the reference constructs a reference graph spanning multiple DLT sources.

10. The method of claim 9, wherein each edge of the reference graph represents direction dependent automatic market maker function that defines how a corresponding liquidity source allows swaps between the token pairs.

11. The method of claim 10, wherein taking a path step comprises splitting the token value at each origin node between all neighboring nodes using a distribution function.

12. The method of claim 11, wherein the distribution function is a SoftMax function that uses the swap efficiencies of the previous iterations of traversing the reference graph to modify the distribution of the token value of each node between all neighboring nodes.

13. The method of claim 12, wherein traversing the reference graph further comprises:

in response to determining a swap efficiency, pruning negligible paths of the reference graph, thereby effectively removing negligible nodes, edges, and swaps from the traversal parameters such that subsequent traversals do not consider those swaps.

14. The method of claim 13, further comprising:

linking to an electronic user wallet, wherein the user wallet contains the start tokens; and via the selected swap path, exchanging the start token for the target token.

15. The method of claim 1, wherein monitoring real-time blockchain state changes comprises establishing WebSocket connections to blockchain nodes and updating AMM function parameters upon detection of new block confirmations or liquidity pool state changes.

16. The method of claim 1, wherein the state-dependent AMM functions comprise liquidity sources from multiple decentralized exchanges including Uniswap V2, Uniswap V3, Curve, and Balancer, each implementing different AMM algorithms with protocol-specific parameters that are read from their respective smart contract implementations.

17. A non-transitory computer-readable medium storing instructions that, when executed by one or more computer processors of a computing platform, cause the computing platform to perform operations comprising:

connecting to a DLT source, thereby retrieving DLT source state data and monitoring real-time blockchain state changes;

constructing, from the DLT source state data, a reference graph, comprising nodes and edges, wherein each node represents a token on the DLT source and has a non-negative token value, and wherein a start token is the only token that has an initial positive token value, and wherein each edge connects a pair of neighboring nodes and represents a state-dependent automatic market maker (AMM) function that updates as tokens are exchanged through the liquidity pool and is dependent on token properties including smart contract rules;

determining traversal hyperparameters for the reference graph, including determining a maximum number of steps, corresponding to a maximum number of path steps that can be taken for a swap path to traverse the reference graph from the start token to a target token, and determining a blockchain state change time frame comprising a time period until the DLT source state is updated;

at a processor system configured to perform iterative processing, iteratively traversing the reference graph graph within the blockchain state change time frame, therein calculating swap efficiencies for swap paths between the start token and the target token, wherein each iteration comprises:

from the start token to the target token, executing all swap paths, wherein each swap path includes fewer intermediary nodes than the maximum number of steps and wherein executing swap paths comprises applying the state-dependent AMM functions, and for all swap paths, determining a swap efficiency; and determining a select swap path based on all swap efficiencies within the blockchain state change time frame.

18. A system comprising of:

one or more computer-readable mediums storing instructions that, when executed by the one or more computer processors, cause a computing platform to perform operations comprising:

connecting to a DLT source, thereby retrieving DLT source state data and monitoring real-time blockchain state changes;

constructing, from the DLT source state data, a reference graph, comprising nodes and edges, wherein each node represents a token on the DLT source and has a non-negative token value, and wherein a start token is the only token that has an initial positive token value, and wherein each edge connects a pair of neighboring nodes and represents a state-dependent automatic market maker (AMM) function that updates as tokens are exchanged through the liquidity pool and is dependent on token properties including smart contract rules;

determining traversal hyperparameters for the reference graph, including determining a maximum number of steps, corresponding to a maximum number of path steps that can be taken for a swap path to traverse the reference graph from the start token to a target token, and determining a blockchain state change time frame comprising a time period until the DLT source state is updated;

at a processor system configured to perform iterative processing, iteratively traversing the reference graph within the blockchain state change time frame, therein calculating swap efficiencies for swap paths between the start token and the target token, wherein each iteration comprises:

from the start token to the target token, executing all swap paths, wherein each swap path includes fewer intermediary nodes than the maximum number of steps, and wherein executing swap paths comprises applying the state-dependent AMM functions, and for all swap paths, determining a swap efficiency; and determining a select swap path based on all swap efficiencies within the blockchain state change time frame.

* * * * *